(12) United States Patent
Seen et al.

(10) Patent No.: US 8,866,879 B2
(45) Date of Patent: Oct. 21, 2014

(54) MOBILE TERMINAL AND METHOD OF CONTROLLING AN IMAGE PHOTOGRAPHING THEREIN

(75) Inventors: Seungmin Seen, Seoul (KR); Jinsool Lee, Seoul (KR); Seunghyun Woo, Songpa-gu (KR); Hayang Jung, Dobong-gu (KR); Shinhae Lee, Mapo-gu (KR)

(73) Assignee: LG Electronics Inc., Seoul (KR)

( * ) Notice: Subject to any disclaimer, the term of this patent is extended or adjusted under 35 U.S.C. 154(b) by 855 days.

(21) Appl. No.: 13/039,911

(22) Filed: Mar. 3, 2011

(65) Prior Publication Data

US 2012/0113216 A1    May 10, 2012

(30) Foreign Application Priority Data

Nov. 4, 2010 (KR) .......................... 10-2010-0109114

(51) Int. Cl.
- H04N 7/00 (2011.01)
- H04N 13/02 (2006.01)
- H04N 5/232 (2006.01)

(52) U.S. Cl.
CPC ....... H04N 13/0239 (2013.01); H04N 13/0285 (2013.01); H04N 13/0296 (2013.01); H04N 5/23293 (2013.01)
USPC ................... 348/38; 348/36; 348/47; 348/46; 348/42; 348/51

(58) Field of Classification Search
USPC ............................. 348/38, 36, 47, 46, 42, 51
See application file for complete search history.

(56) References Cited

U.S. PATENT DOCUMENTS

| | | | |
|---|---|---|---|
| 8,760,448 B2 * | 6/2014 | Lee et al. | 345/419 |
| 2007/0046809 A1 | 3/2007 | Nakamura | |
| 2008/0158346 A1 * | 7/2008 | Okamoto et al. | 348/47 |
| 2010/0062803 A1 * | 3/2010 | Yun et al. | 455/556.1 |
| 2010/0225744 A1 | 9/2010 | Tomizawa et al. | |
| 2010/0283833 A1 * | 11/2010 | Yeh | 348/46 |

FOREIGN PATENT DOCUMENTS

WO    WO 2010/109264 A1    9/2010

* cited by examiner

*Primary Examiner* — Shawn An
(74) *Attorney, Agent, or Firm* — Birch, Stewart, Kolasch & Birch, LLP

(57) ABSTRACT

A mobile terminal including a first camera configured to receive an input of a first image; a second camera configured to receive an input of a second image; a touchscreen configured to display a photograph command key including a first zone, a second zone and a common zone; and a controller configured to set a photograph mode selected from a 3D photograph mode and a 2D photograph mode, to control the first and second cameras to respectively capture the first and second images upon receiving a photograph command touch action on the common zone, and to perform either a 3D image processing or a 2D image processing on the photographed first and second images according to the set photograph mode.

19 Claims, 33 Drawing Sheets

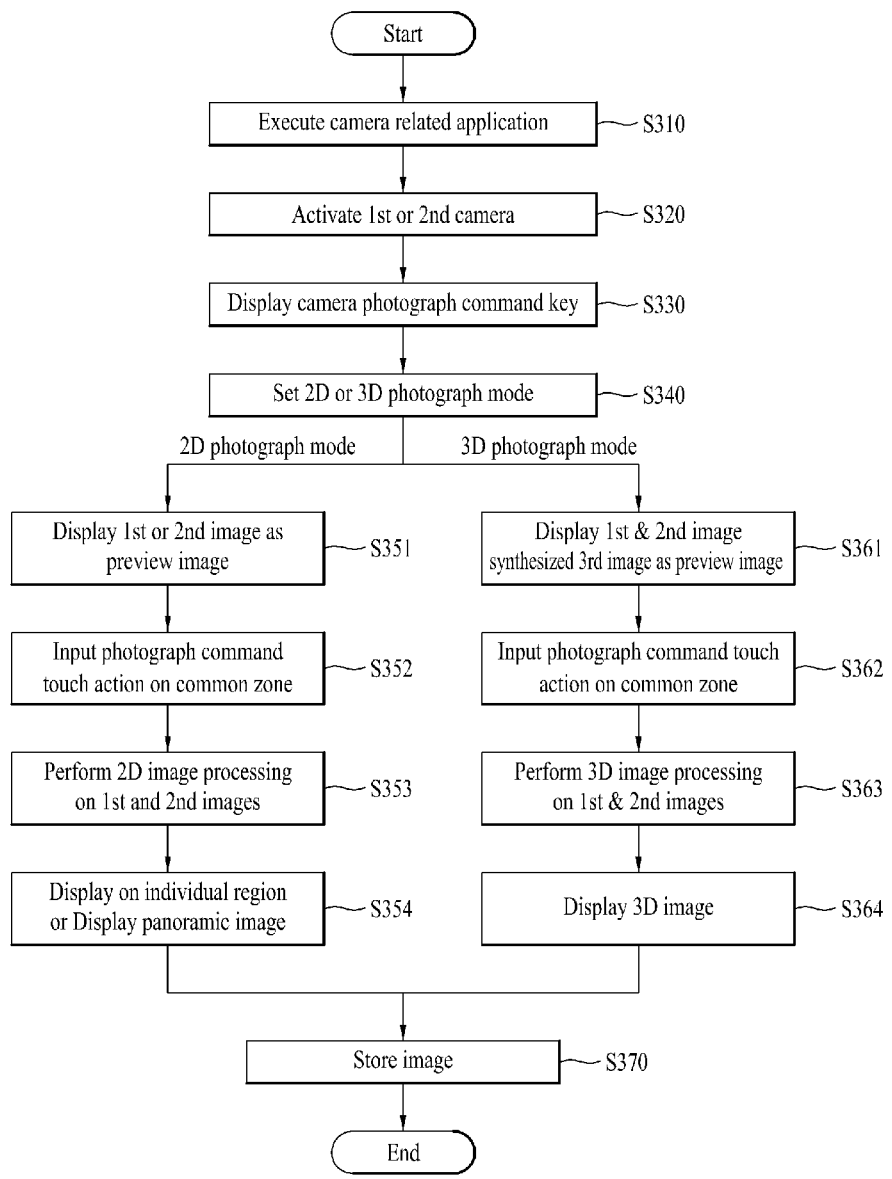

(a)

(b)

FIG. 4C
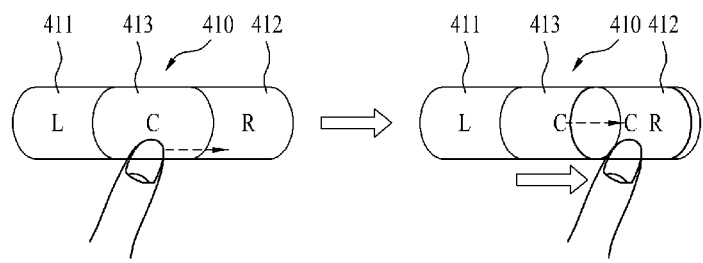
(a)
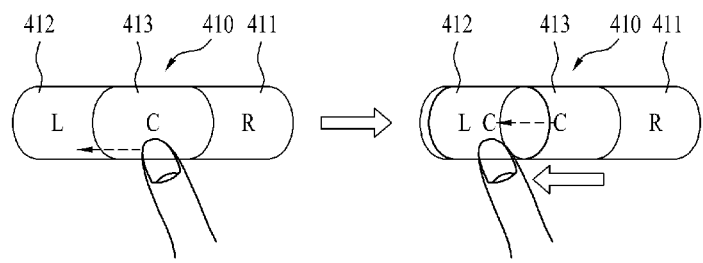
(b)
FIG. 4D
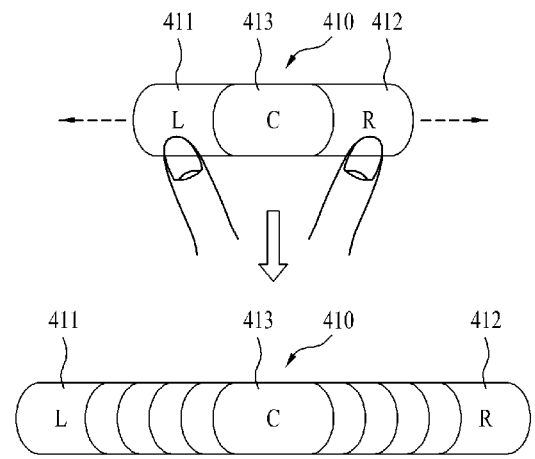

FIG. 6A
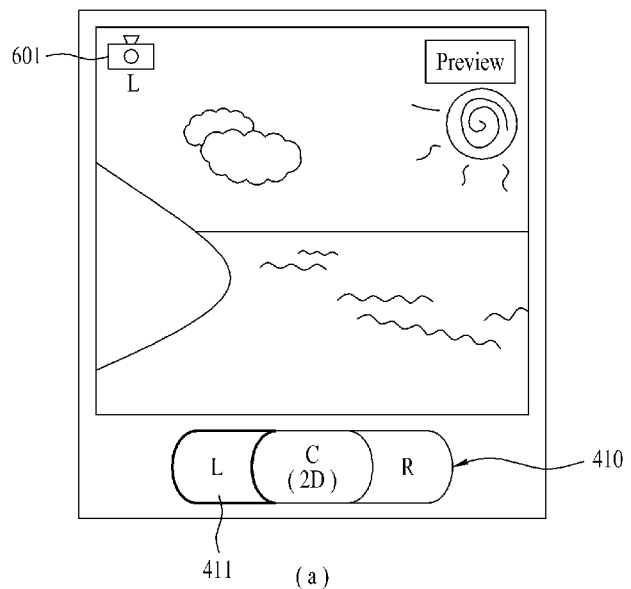
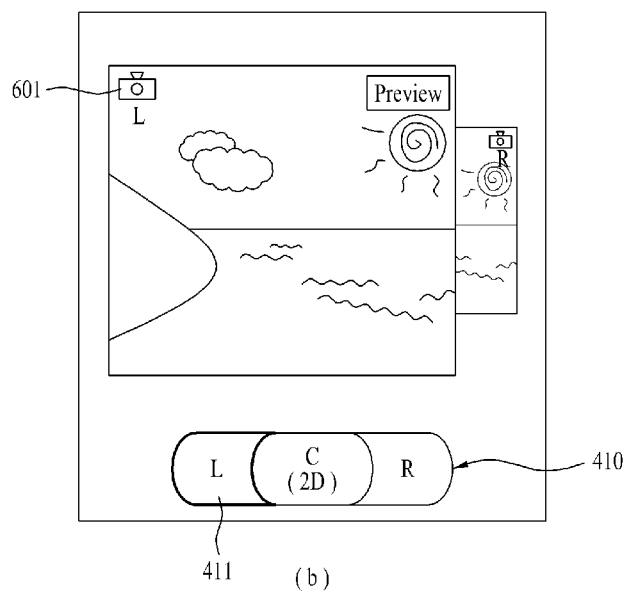

FIG.9B
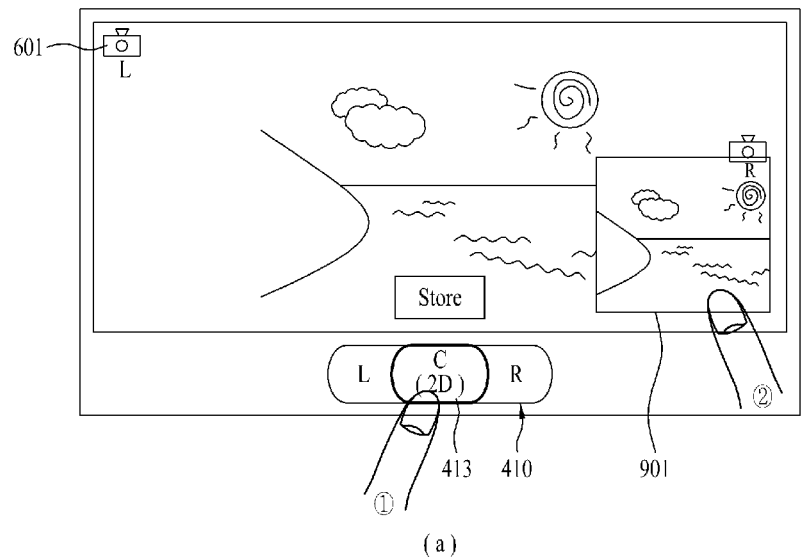
(a)
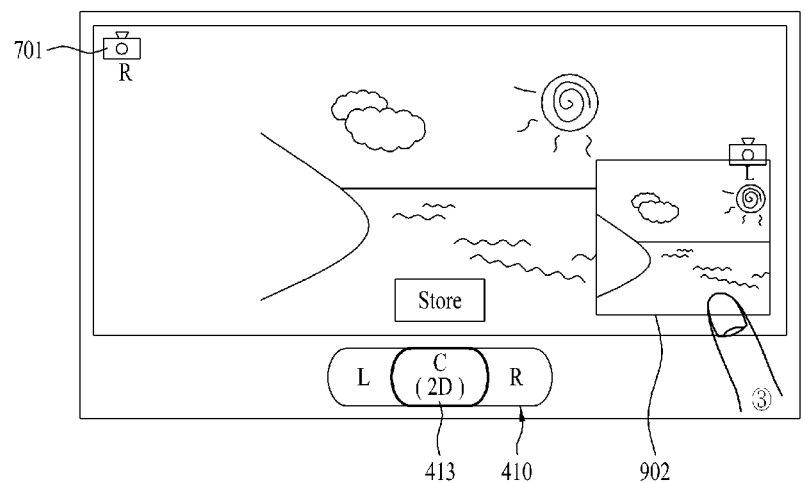
(b)

FIG. 10B
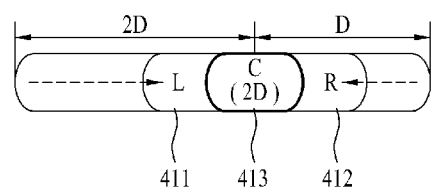
(a)
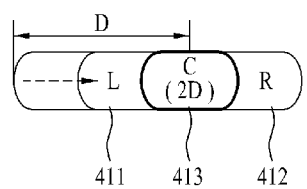
(b)
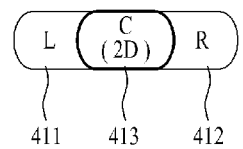
(c)

FIG. 13A
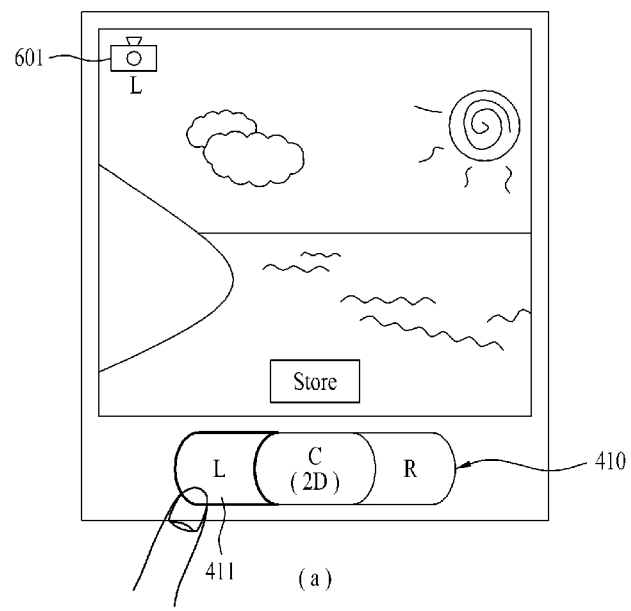
(a)
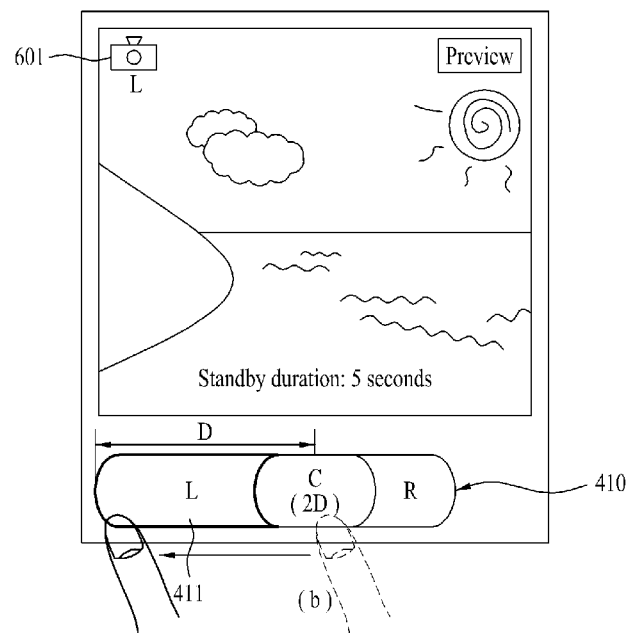
(b)

FIG. 13B
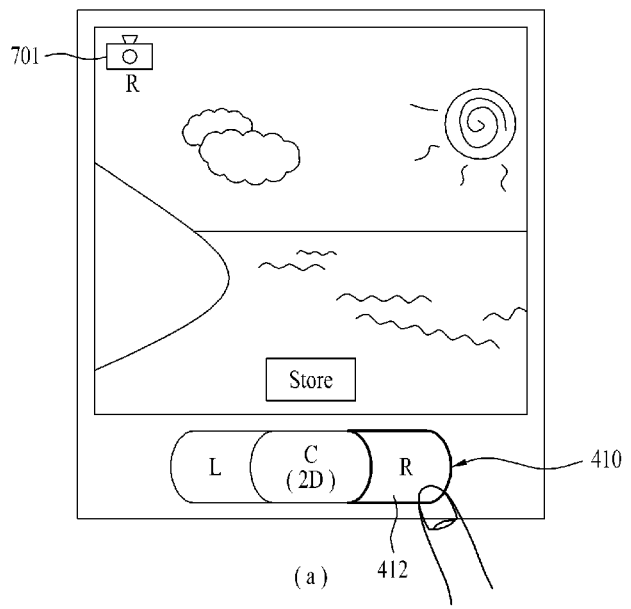
(a)
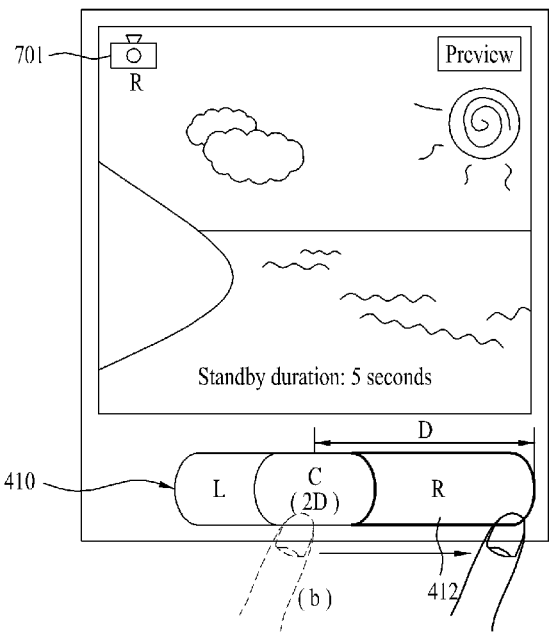
(b)

MOBILE TERMINAL AND METHOD OF CONTROLLING AN IMAGE PHOTOGRAPHING THEREIN

Pursuant to 35 U.S.C. §119(a), this application claims the benefit of earlier filing date and right of priority to Korean Application No. 10-2010-0109114, filed on Nov. 4, 2010, the contents of which are hereby incorporated by reference herein in their entirety.

BACKGROUND OF THE INVENTION

1. Field of the Invention

The present invention relates to a mobile terminal, and more particularly, to a mobile terminal and method of controlling an image photographing therein.

2. Discussion of the Related Art

Generally, terminals can be classified into mobile/portable terminals and stationary terminals. Further, the mobile terminals can be classified into handheld terminals and vehicle mount terminals. The terminal includes many functions such as photographing of photos or moving pictures, playback of music or moving picture files, game play, broadcast reception, etc. and thus functions as a multimedia player.

However, the photographing capabilities of the mobile terminal are still limited, which inconveniences the user.

SUMMARY OF THE INVENTION

Accordingly, one object of the present invention is to provide a mobile terminal and corresponding method of controlling an image photographing operation that substantially obviates one or more problems due to limitations and disadvantages of the related art.

Another object of the present invention is to provide a user interface for effectively receiving an input of a control command for each of a plurality of cameras provided to a mobile terminal.

Still another object of the present invention is to provide a mobile terminal and method of controlling an image photographing therein, by generating a new photographed image from a plurality of images photographed using a plurality of cameras provided to a mobile terminal.

To achieve these objects and other advantages and in accordance with the purpose of the invention, as embodied and broadly described herein, the present invention provides in one aspect, a mobile terminal including a first camera configured to receive an input of a first image; a second camera configured to receive an input of a second image; a touchscreen configured to display a photograph command key including a first zone, a second zone and a common zone; and a controller configured to set a photograph mode selected from a 3D photograph mode and a 2D photograph mode, to control the first and second cameras to respectively capture the first and second images upon receiving a photograph command touch action on the common zone, and to perform either a 3D image processing or a 2D image processing on the photographed first and second images according to the set photograph mode.

In another aspect, the present invention provides a method of controlling a mobile terminal, and which includes receiving, via a first camera on the mobile terminal, an input of a first image; receiving, via a second camera on the mobile terminal, an input of a second image; displaying, on a touchscreen of the mobile terminal, a photograph command key including a first zone, a second zone and a common zone; setting, via a controller on the mobile terminal, a photograph mode selected from a 3D photograph mode and a 2D photograph mode; controlling, via the controller, the first and second cameras to respectively capture the first and second images upon receiving a photograph command touch action on the common zone; and performing, via the controller, either a 3D image processing or a 2D image processing on the photographed first and second images according to the set photograph mode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a flowchart illustrating a method of controlling an image photographing in a mobile terminal according to one embodiment of the present invention;

FIGS. 4A to 4D are diagrams of a camera photograph key according to an embodiment of the present invention;

FIGS. 6A to 6C are diagrams of a preview image input from a left camera in a 2D photograph mode according to an embodiment of the present invention;

FIGS. 9A to 9C are diagrams for photographing a first image and a second image when receiving an input of a photograph command touch action on a common zone in a 2D photograph mode according to an embodiment of the present invention;

FIGS. 13A and 13B are diagrams for photographing a first image or a second image when receiving an input of a photograph command touch action on a first or second zone in a 2D photograph mode according to an embodiment of the present invention;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

In addition, mobile terminals described in this disclosure include a mobile phone, a smart phone, a laptop computer, a digital broadcast terminal, a PDA (personal digital assistants), a PMP (portable multimedia player), a navigation system and the like. Except when applicable to a mobile terminal only, embodiments described in this disclosure are applicable to a stationary terminal such as a digital TV, a desktop computer and the like.

Figure 1:
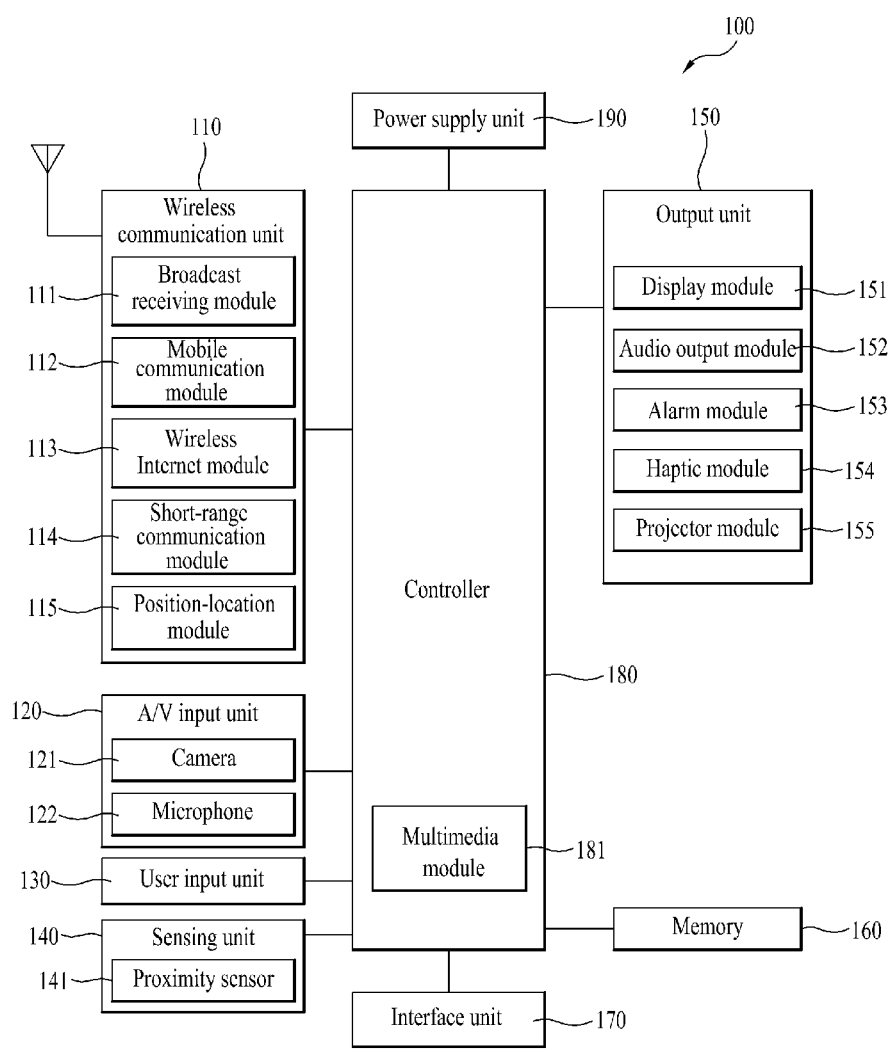
FIG. 1 is a block diagram of a mobile terminal according to one embodiment of the present invention.

FIG. 1 is a block diagram of a mobile terminal 100 according to one embodiment of the present invention. As shown, the mobile terminal 100 includes a wireless communication unit 110, an A/V (audio/video) input unit 120, a user input unit 130, a sensing unit 140, an output unit 150, a memory 160, an interface unit 170, a controller 180, a power supply module 190 and the like. FIG. 1 shows the mobile terminal 100 having various components, but implementing all of the illustrated components is not a requirement. Greater or fewer components may alternatively be implemented.

Further, the wireless communication unit 110 generally includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. In addition, the broadcast managing server generally refers to a server which generates and transmits a broadcast signal and/or broadcast associated information or a server, which is provided with a previously generated broadcast signal and/or broadcast associated information and then transmits the provided signal or information to a terminal.

The broadcast signal may be implemented as a TV broadcast signal, a radio broadcast signal, and a data broadcast signal, among others. If desired, the broadcast signal may further include a broadcast signal combined with a TV or radio broadcast signal. The broadcast associated information also includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of the digital multimedia broadcasting (DMB) system and an electronic service guide (ESG) of the digital video broadcast-handheld (DVB-H) system.

In addition, the broadcast receiving module 111 may be configured to receive broadcast signals transmitted from various types of broadcast systems. In a non-limiting example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as media forward link only (MediaFLO®) and the integrated services digital broadcast-terrestrial (ISDB-T) system. Optionally, the broadcast receiving module 111 can be configured for other broadcasting systems as well as the above-explained digital broadcasting systems. Further, the broadcast signal and/or broadcast associated information received by the broadcast receiving module 111 may be stored in a suitable device, such as a memory 160.

In addition, the mobile communication module 112 transmits/receives wireless signals to/from one or more network entities (e.g., base station, external terminal, server, etc.). Such wireless signals may represent audio, video, and data according to text/multimedia message transceivings, among others.

Also, the wireless Internet module 113 supports Internet access for the mobile terminal 100 and may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short range communications. Suitable technologies for implementing this module include radio frequency identification (RFID), infrared data association (IrDA), ultra-wideband (UWB), as well at the networking technologies commonly referred to as Bluetooth and ZigBee, to name a few. In addition, the position-location module 115 identifies or otherwise obtains the location of the mobile terminal 100. If desired, this module may be implemented with a global positioning system (GPS) module.

Further, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. The processed image frames can then be displayed on the display module 151.

In addition, the image frames processed by the camera 121 can be stored in the memory 160 or can be externally transmitted via the wireless communication unit 110. At least two cameras 121 can also be provided to the mobile terminal 100.

The microphone 122 receives an external audio signal while the portable device is in a particular mode, such as phone call mode, recording mode and voice recognition. The audio signal is then processed and converted into electric audio data. The processed audio data is transformed into a format transmittable to a mobile communication base station via the mobile communication module 112 when a call mode. The microphone 122 also generally includes assorted noise removing algorithms to remove noise generated in the course of receiving the external audio signal.

In addition, the user input unit 130 generates input data responsive to user manipulation of an associated input device or devices. Examples of such devices include a keypad, a dome switch, a touchpad (e.g., static pressure/capacitance), a jog wheel, a jog switch, etc. Further, the sensing unit 140 provides sensing signals for controlling operations of the mobile terminal 100 using status measurements of various aspects of the mobile terminal. For instance, the sensing unit 140 may detect an opened/closed status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is opened or closed. Other examples include the sensing unit 140 sensing the presence or absence of power provided by the power supply 190, the presence or absence of a coupling or other connection between the interface unit 170 and an external device. In FIG. 1, the sensing unit 140 also includes a proximity sensor 141.

The output unit 150 also generates outputs relevant to the senses of sight, hearing, touch and the like. In FIG. 1, the output unit 150 includes the display module 151, an audio output module 152, an alarm module 153, a haptic module 154, a projector module 155 and the like. The display module 151 is generally implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display module 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display module 151 can be implemented in the optical transmittive type as well. In this configuration, a user can see an object in rear of a terminal body via the area occupied by the display module 151 of the terminal body.

At least two display modules 151 can also be provided to the mobile terminal 100. For instance, a plurality of display modules can be arranged on a single face of the mobile terminal 100 in a manner of being spaced apart from each other or being built in one body. Alternatively, a plurality of display modules can be arranged on different faces of the mobile terminal 100.

When the display module 151 and a sensor for detecting a touch action (hereinafter called 'touch sensor') configures a mutual layer structure (hereinafter called 'touchscreen'), the display module 151 can be used as an input device as well as an output device. In this instance, the touch sensor can be configured as a touch film, a touch sheet, a touchpad or the like.

Further, the touch sensor can be configured to convert a pressure applied to a specific portion of the display module 151 or a variation of a capacitance generated from a specific portion of the display module 151 to an electric input signal. Moreover, the touch sensor can be configured to detect a pressure of a touch as well as a touched position or size.

If a touch input is made to the touch sensor, signal(s) corresponding to the touch is transferred to a touch controller. The touch controller then processes the signal(s) and then transfers the processed signal(s) to the controller 180. Therefore, the controller 180 can know whether a prescribed portion of the display module 151 is touched.

Referring to FIG. 1, the proximity sensor 141 can be provided to an internal area of the mobile terminal 100 enclosed by the touchscreen or around the touchscreen. The proximity sensor 141 is the sensor that detects a presence or non-presence of an object approaching a prescribed detecting surface or an object existing around the proximity sensor using an electromagnetic field strength or infrared ray without mechanical contact. Hence, the proximity sensor 141 has a durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, the proximity sensor 141 detects the proximity of a pointer using a variation of electric field according to the proximity of the pointer. In this instance, the touchscreen (touch sensor) can be classified as the proximity sensor.

In the following description, for clarity, an action that a pointer approaches without contacting with the touchscreen to be recognized as located on the touchscreen is named 'proximity touch'. Further, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor 141 also detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be output to the touchscreen.

Further, the audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

Also, the alarm module 153 outputs a signal for announcing the occurrence of a particular event associated with the mobile terminal 100. Typical events include a call received event, a message received event and a touch input received event. The alarm module 153 can output a signal for announcing the event occurrence using vibration as well as video or audio signal. The video or audio signal can be output via the display module 151 or the audio output unit 152. Hence, the display module 151 or the audio output module 152 can be regarded as a part of the alarm module 153.

Further, the haptic module 154 generates various tactile effects that can be sensed by a user. Vibration is a representative one of the tactile effects generated by the haptic module 154. The strength and pattern of the vibration generated by the haptic module 154 are also controllable. For instance, different vibrations can be synthesized together and out or can be output in sequence.

The haptic module 154 can also generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

In addition, the projector module 155 performs an image projector function using the mobile terminal 100. In more detail, the projector module 155 can display an image, which is identical to or partially different at least from the image displayed on the display module 151, on an external screen or wall according to a control signal of the controller 180.

In particular, the projector module 155 can include a light source generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. The projector module 155 can also include a device for adjusting an image projected direction by mechanically moving the lens or the whole module.

In addition, the projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151. Preferably, the projector module 155 is provided in a length direction of a lateral, front or backside direction of the mobile terminal 100. However, the projector module 155 can be provided to any portion of the mobile terminal 100.

In addition, the memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. A recent use history or a cumulative use frequency of each data (e.g., use frequency for each phonebook, each message or each multimedia) can also be stored in the memory unit 160. Moreover, data for various patterns of vibration and/or sound output when a touch input to the touchscreen can be stored in the memory unit 160.

The memory 160 may also be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. The mobile terminal 100 can also operate in association with a web storage for performing a storage function of the memory 160 on Internet.

Further, the interface unit 170 can be implemented to couple the mobile terminal 100 with external devices. The interface unit 170 then receives data from the external devices or is supplied with the power and then transfers the data or power to the respective elements of the mobile terminal 100 or enables data within the mobile terminal 100 to be transferred to the external devices. The interface unit 170 may also be configured using a wired/wireless headset port, an external charger port, a wired/wireless data port, a memory card port, a port for coupling to a device having an identity module, audio input/output ports, video input/output ports, an earphone port and/or the like.

Also, an identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

In addition, the controller 180 controls the overall operations of the mobile terminal 100. For example, the controller 180 performs the control and processing associated with voice calls, data communications, video calls, etc. The controller 180 may also include a multimedia module 181 that provides multimedia playback. The multimedia module 181 may be configured as part of the controller 180, or implemented as a separate component. Moreover, the controller 180 can perform a pattern recognizing process for recognizing a writing input and a picture drawing input carried out on the touchscreen as characters or images, respectively.

Further, the power supply module 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
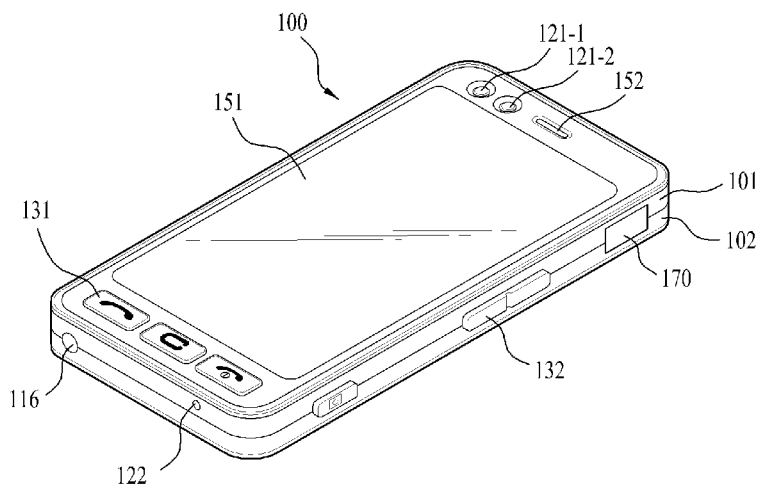
FIG. 2A is a front perspective diagram of a mobile terminal according to one embodiment of the present invention.
Figure 2B:
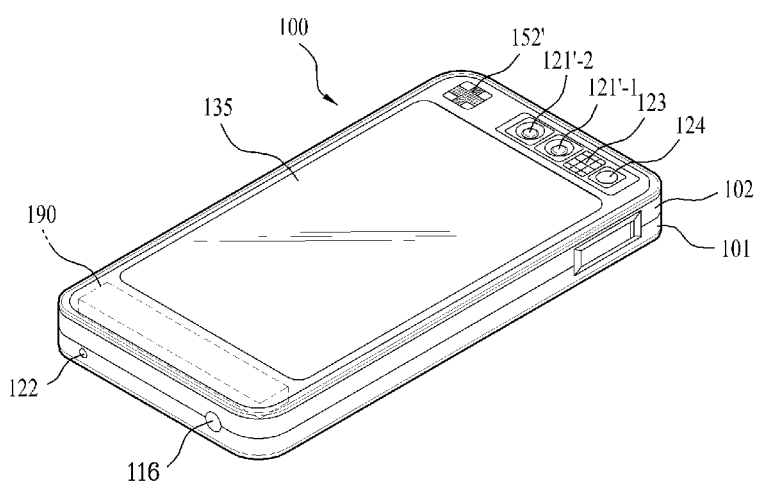
FIG. 2B is a rear perspective diagram of a mobile terminal according to one embodiment of the present invention.

Next, FIGS. 2A and 2B illustrate a plurality of cameras provided to front and rear sides of a terminal, respectively. For clarity and convenience of the following description, assume that a plurality of the cameras include a first camera and a second camera.

Referring to FIGS. 2A and 2B, first and second cameras 121-1 and 121-2 can be provided on the same side (i.e., front side in FIG. 2A) in parallel with each other. Also, first and second cameras 121'-1 and 121'-2 can be provided on the same side (i.e., rear side in FIG. 2B) in parallel with each other.

For instance, referring to FIG. 2A, the first camera 121-1 and the second camera 121-2 are provided to left and right parts, respectively. When a same subject is photographed, the first camera 121-1 photographs an image in which the subject is positioned at relatively right side within a photograph angle range, and the second camera 121-2 photographs an image in which the subject is positioned at relatively left side within the photograph angle range.

Although the drawings show that the first and second cameras are horizontally arranged in the same plane in parallel with each other, if the first and second cameras are positioned to photograph a same subject despite differing from each other in a photograph angle range, the arrangement formation is non-limited. Also, if a camera related application is executed, at least one of the first cameras 121-1 and 121'-1 and the second cameras 121-2 and 121'-2 can be activated.

A method of displaying a 3D image in a mobile terminal applicable to embodiments of the present invention and a display module configuration for the same will now explained.

Stereoscopic images implemented on the display module 151 of the mobile terminal 100 according to an embodiment of the present invention can be mainly classified into two categories. In this instance, the reference for this classification is attributed to whether different images are provided to both eyes, respectively.

The first stereoscopic image category is described as follows. The first category is a monoscopic scheme of providing the same image to both eyes and is advantageous because it can be implemented with a general display module 151. In particular, the controller 180 arranges a polyhedron generated from combining at least one of dots, lines, surfaces or combination thereof in a virtual 3D space and enables an image, which is generated from seeing the polyhedron in a specific view, to be displayed on the display module 151. Therefore, such a stereoscopic image can substantially include a planar image.

The second category is a stereoscopic scheme of providing a different image to both eyes, respectively, which uses the principle that a user can sense a stereoscopic effect when looking at an object. In particular, human eyes are configured to see different planar images when looking at the same object due to a distance between both eyes. These different images are forwarded to the brain via retinas. The human brain then senses depth and reality of a 3D image by combining the different images together.

Therefore, the binocular disparity attributed to the distance between both eyes enables the user to sense the stereoscopic effect despite that there is an individual difference of the binocular disparity more or less. Thus, the binocular disparity is an important factor of the second category. Binocular disparity will now explained in more detail with reference to FIG. 2C.

Figure 2C:
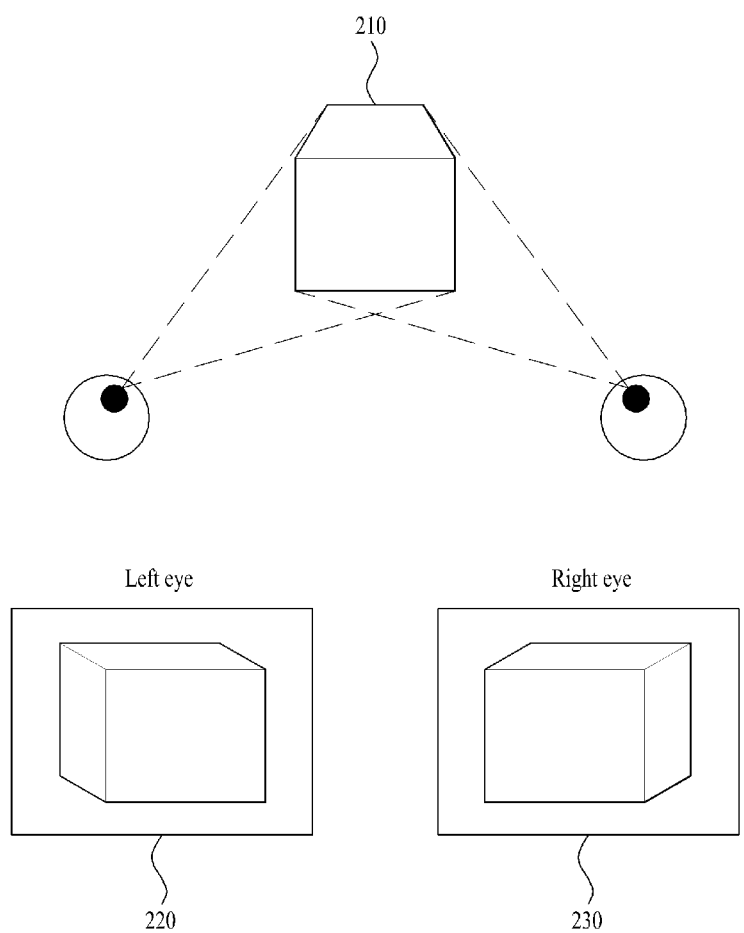
FIG. 2C is a diagram illustrating the principle of binocular disparity.

In particular, FIG. 2C is a conceptional diagram for explaining the principle of binocular disparity. Referring to FIG. 2C, assume a situation that a hexahedron 210 is positioned as a subject in front below an eye's height to be seen through human eyes. In this instance, a left eye can see a left eye planar image 220 revealing three facets including a top side, a front side and a left lateral side of the hexahedron 210 only. Also, a right eye can see a right eye planar image 230 revealing three facets including the top side, the front side and a right lateral side of the hexahedron 210 only.

Even if a real thing is not actually positioned in front of both eyes of a user, if the left eye planar image 220 and the right eye planar image 230 are set to arrive at the left eye and the right eye, respectively, a user can sense the hexahedron 210 as if actually looking at the hexahedron 210.

Thus, in order to implement the stereoscopic image belonging to the second category in the mobile terminal 100, images of the same object should arrive at both eyes in a manner of being discriminated from each other for the left and right eye images of the same object with a predetermined parallax.

In order to discriminate the above-mentioned two categories from each other in this disclosure, a stereoscopic image belonging to the first category is named '2D stereoscopic image' and a stereoscopic image belonging to the second category is named '3D stereoscopic image'.

A method of implementing a 3D stereoscopic image is described as follows. First, as mentioned in the following description, in order to implement a 3D stereoscopic image, an image for a right eye and an image for a left eye need to arrive at both eyes in a manner of being discriminated from each other. For this, various methods are explained as follows.

1) Parallax Barrier Scheme

The parallax barrier scheme enables different images arrive at both eyes by controlling a propagating direction of light by electronically driving a cutoff device provided between a general display and both eyes. A structure of a parallax barrier type display module 151 for displaying a 3D stereoscopic image can be configured combining a general display device 151*a* with a switch LC (liquid crystals).

A propagating direction of light is then controlled by activating an optical parallax barrier using the switch LC, whereby the light is separated into two different lights to arrive at left and right eyes, respectively. Thus, when an image generated from combining an image for the right eye and an image for the left eye together is displayed on the display device, a user sees the images corresponding to the eyes, respectively, thereby feeling the 3D or stereoscopic effect.

Alternatively, the parallax barrier attributed to the switch LC is electrically controlled to enable all light to be transmitted therethrough, whereby the light separation due to the parallax barrier is avoided. Therefore, the same image can be seen through left and right eyes. In this instance, the same function of a related art display module is available.

Besides, although the parallax barrier performs parallel translation in one axial direction to provide a 3D stereoscopic image, one embodiment of the present invention can use a parallax barrier that enables parallel translation in at least two axial directions according to a control signal from the controller 180.

2) Lenticular

The lenticular scheme relates to a method of using a lenticular screen provided between a display and both eyes. In particular, a propagating direction of light is refracted via lens on the lenticular screen, whereby different images arrive at both eyes, respectively.

3) Polarized Glasses

According to the polarized glasses scheme, polarizing directions are set orthogonal to each other to provide different images to both eyes, respectively. When circular polarization, polarization is performed to have different rotational direction, whereby different images can be provided to both eyes, respectively.

4) Active Shutter

This scheme is similar to the glasses scheme. In particular, a right eye image and a left eye image are alternately displayed on a display module with prescribed periodicity. Also, the user's glasses close its shutter in an opposite direction when an image of a corresponding direction is displayed. Therefore, the image of the corresponding direction can arrive at the eyeball in the corresponding direction.

Namely, while the left eye image is being displayed, a shutter of the right eye is closed to enable the left eye image to arrive at the left eye only. On the contrary, while the right eye image is being displayed, a shutter of the left eye is closed to enable the right eye image to arrive at the right eye only.

A method of controlling an image photographing using a plurality of cameras in a mobile terminal according to one embodiment of the present invention will now be explained with reference to the accompanying drawings. Moreover, in one embodiment, the mobile terminal 100 includes a first camera and a second camera, and the display module includes a touchscreen, for example. In the following description, the same reference number 151 of the display module is given to the touchscreen.

In particular, a mobile terminal applicable to an embodiment of the present invention includes a display module capable of providing a user with a 3D stereoscopic image by one of the above described 3D stereoscopic image implementing schemes.

Next, FIG. 3 is a flowchart illustrating a method of controlling an image photographing in a mobile terminal according to one embodiment of the present invention. Referring to FIG. 3, the controller 180 of the mobile terminal 100 executes a camera related application (S310).

In particular, the mobile terminal 100 displays an application list including a plurality of applications. If a user selects the camera related application from the application list, the mobile terminal 100 executes the selected camera related application.

In this instance, the camera related application can be stored in the mobile terminal 100 or be received or downloaded from an external terminal or an external server. Optionally, if the user selects a key zone (e.g., a hot key) or a button key corresponding to a camera related application execute command or a terminal motion (e.g., shaking, inclination at a predetermined angle, etc.) corresponding to a camera related application execute command is detected, the mobile terminal 100 can perform the executing step S310.

When the camera related application is executed, the controller 180 activates at least one of the first camera and the second camera (S320). In this instance, the camera activation can include the following states. First, a camera module is turned on, and second an image input via the turned-on camera module is displayed or photographed as a preview image.

For instance, if one of the first and second cameras is designated in advance to be activated at a timing point of a camera related application execution, the mobile terminal 100 can activate the designated camera only. Alternatively, if the designated camera does not exist, the mobile terminal 100 activates both of the first and second cameras or can activate either the first camera or the second camera.

Alternatively, the mobile terminal 100 can allow a user to select a camera to activate by displaying a list of activation target cameras (e.g., first and second cameras) at an execution start timing point of the camera related application. Therefore, the mobile terminal 100 can activate the camera selected by the user only.

The mobile terminal 100 also displays a photograph command key including a first zone, a second zone and a common zone on a prescribed region of a screen (S330). In particular, the step S330 can be performed using the touchscreen 151. In this instance, the photograph command key can be a key for receiving an input of a camera operation related a touch action (e.g., a photograph command touch action, a preview command touch action, a configuration setting touch action, etc.) for at least one of the first and second cameras.

In more detail, the first zone is a zone for receiving an input of a camera operation related touch action for the first camera, the second zone is a zone for receiving an input of a camera operation related touch action for the second camera, and the common zone is a zone for receiving an input of a camera operation related touch action in common to both of the first camera and the second camera.

Further, in the displaying step S330, the mobile terminal 100 displays a preview image on a screen center and can display the photograph command key on a prescribed region of the screen (e.g., a screen bottom). Moreover, the mobile terminal 100 can shift a position of the photograph command key according to a user selection. For instance, when receiving an input of a touch & drag action from a first point within the photograph command key to a second point within the screen or an input of a touch action on each of the first and second points, the mobile terminal 100 can shift the photograph command key to the position corresponding to the second point.

In addition, the mobile terminal 100 can switch the zones within the photograph command key to one another according to a user selection. The mobile terminal 100 can also change a size of the photograph command key or a size of each of the first zone, the second zone and the common zone included in the photograph command key.

For instance, under the control of the controller 180, the mobile terminal 100 changes a size of the photograph command key or a size of the corresponding zone to correspond to a user input action. The mobile terminal 100 also enlarges a size of the zone having a high frequency of selection for a predetermined period of time. Further, the mobile terminal 100 reduces a size of the zone having a low frequency of selection for a predetermined period of time.

The structure of the photograph command key will now be described in more detail with reference to FIGS. 4A to 4D. In this example description, the first camera and the second camera correspond to a left camera and a right camera, respectively.

Figure 4A:
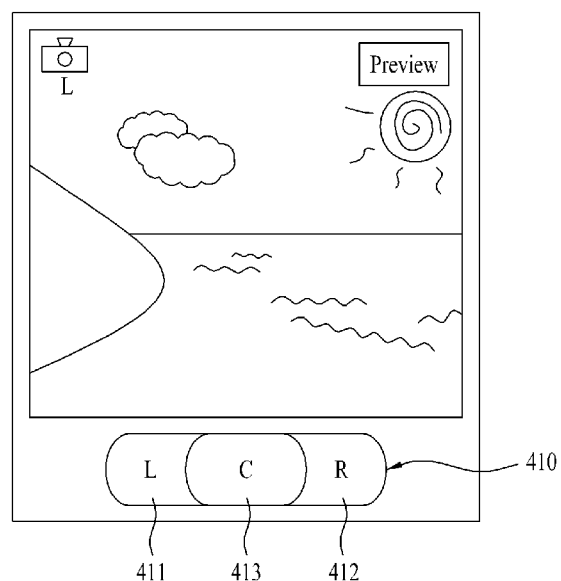

Referring to FIG. 4A, the mobile terminal 100 displays a preview image on the screen and displays a photograph command key 410 on a bottom of the screen. In this example, the photograph command key 410 includes a first zone 411, a second zone 412 and a common zone 413. In particular, the first zone 411 is arranged to the left side of the photograph command key if the first camera is the left camera, and the second zone 412 is arranged to the right side of the photograph command key if the second camera is the right camera.

In addition, the mobile terminal 100 can display identification information on the corresponding camera within each of the first zone 411, the second zone 412 and the common zone 413. For instance, the identification information can include a number of a corresponding camera (e.g., first camera_1, second camera_2, common_1+2), a color of a corresponding camera (e.g., first camera_red, second camera_blue, common_green), a name of a corresponding camera (e.g., first camera_Left or L, second camera_Right or R, common_Common or C) and the like, by which the present invention is non-limited. For instance, the identification information can be represented in various ways.

Figure 4B:
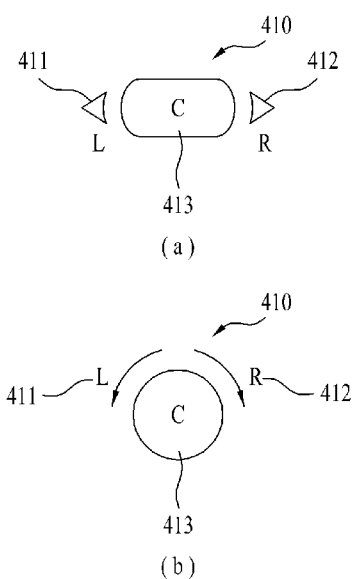

Referring to FIG. 4A and FIG. 4B, the photograph command key 410 is provided in various forms. Referring to FIG. 4A, the photograph command key 410 is divided into three equal parts including first to third zones. Also, the first zone 411, the common zone 413 and the second zone 412 can be assigned to the first zone, the second zone and the third zone in the right direction, respectively. Moreover, a shape of the photograph command key 410 can be represented as various forms including an oval shape.

Referring to FIG. 4B(a), the photograph command key 410 includes the common zone 413 at its center, the first zone 411 of a direction indicator type provided to the left side of the common zone 413, and the second zone 412 of a direction indicator type provided to the right side of the common zone 413.

Referring to FIG. 4A or FIG. 4B(a), the mobile terminal 100 can receive a touch action on the first zone 411 or the second zone 412 or an input of a touch & drag action from the common zone 413 to the first or second zone 411 or 412 as a camera operation related touch action on the first zone 411 or the second zone 412 from a user. Moreover, the mobile terminal 100 can receive an input of a touch action on the common zone 413 as a camera operation related touch action on the common zone 413 from a user.

Referring to FIG. 4B(b), the photograph command key 410 includes a circular key assigned to the common zone 413. However, the circular key can be assigned the first zone 411 in a counterclockwise direction or assigned the second zone 412 in a clockwise direction.

Referring again to FIG. 4B(b), the user of the mobile terminal 100 can input a touch action for rotating the circular key clockwise/counterclockwise as a camera operation related touch action on the first/second zone 411/412. Moreover, the user can input a touch action on the circular key as a camera operation related touch action on the common zone 413.

Referring to FIG. 4C, the user can perform a touch & drag action on the photograph command key 410 from one of the first zone 411, the second zone 412 and the common zone 413 to another zone and temporarily drag a position of one zone to another zone to correspond to the touch & drag action. When the touch & drag action ends, the position of the shifted or dragged zone can return to the original position.

Referring to FIG. 4D, when the user performs a first touch & drag action from a first point of the first zone 411 outward and a second touch & drag action from a second point of the second zone 412 outward simultaneously or separately, the photograph command key 410 can be configured so the first zone 411 and the second zone 412 are extended outwardly to correspond to the first touch & drag action and the second touch & drag action, respectively.

When the first touch & drag action and the second touch & drag action end, the first zone 411 an the second zone 412 gradually return to their original statuses, respectively. For instance, the bigger the extended extent gets, the longer time it takes to return to the original status.

Referring back to FIG. 3, when executing the camera related application, the controller 180 sets either a 2D photograph mode or a 3D photograph mode (S340). In addition, the 2D photograph mode corresponds to a mode for treating a first image photographed via the first camera and a second image photographed via the second camera as individual photographed images, respectively. The 3D photograph mode corresponds to a mode for treating a 3D image generated from synthesizing a first image photographed via the first camera and a second image photographed via the second camera together as a photographed image.

Also, in the setting step S340, the user can set the photograph mode from the 2D and 3D photograph modes, or the controller 180 can randomly select the photograph mode. Further, the selection of the photograph mode by the user or the controller 180 can be performed before or after the camera related application execution.

For instance, the pre-selection by the user can be performed if a menu item corresponding to the photograph mode selection is executed via a menu search. Also, the post-selection by the user can be executed if a window for selecting either the 2D photograph mode or the 3D photograph mode at a start point of the camera related application execution or the corresponding menu item is executed. Moreover, the selection by the controller 180 can be performed by automatically selecting the camera activated in a lately executed camera related application or the camera having a high activation time (or activation frequency) for a predetermined period of time.

In addition, in the setting step S340, the mobile terminal 100 can receive an input of a photograph mode switching touch action on the common zone in the photograph command key. Then, if the 2D photograph mode is currently set, the controller 180 can switch the 2D photograph mode to the 3D photograph mode. On the contrary, if the 3D photograph mode is currently set, the controller 180 can switch the 3D photograph mode to the 2D photograph mode.

In addition, the photograph mode switching touch action corresponds to a touch action for requesting the currently set photograph mode be switched to another photograph mode. The photograph mode switching touch action can also have a touch pattern different from that of a photograph command touch action on the common zone or a preview command touch action, which will be described later.

For instance, the photograph mode switching touch action can have a pattern of maintaining a touch during a first period of time or a pattern of a single touch, can have a pattern of maintaining a touch during a second period of time or a pattern of double touches, and can have a pattern of maintaining a touch during a third period of time or a pattern of triple touches. Moreover, the common zone can have a red color as a feedback according to a touch action input if a photograph mode switching touch action is input. The common zone can also have a blue color as a feedback according to a touch action input if a preview command touch action is input. Further, the common zone can have a green color as a feedback according to a touch action input if a photograph command touch action is input.

Meanwhile, identification information on a currently set photograph mode can be displayed within the common zone. For example, if a currently set photograph mode is a 2D setting mode, the identification information can include one of 2D, 2 dimensions, 2, a random planar image and the like. In another example, if a currently set photograph mode is a 3D setting mode, the identification information can include one of 3D, 3 dimensions, 3, a random stereoscopic image and the like. In addition, per-photograph mode identification information, which will be displayed within the common zone, can be selected by a user from identification information stored in the memory or identification information received from an external server or an external terminal.

The setting step S340 will not be explained in more detail with reference to FIGS. 5A and 5B, which are diagrams illustrating a switching process between a 2D photograph mode and a 3D photograph mode according to an embodiment of the present invention.

Figure 5A:
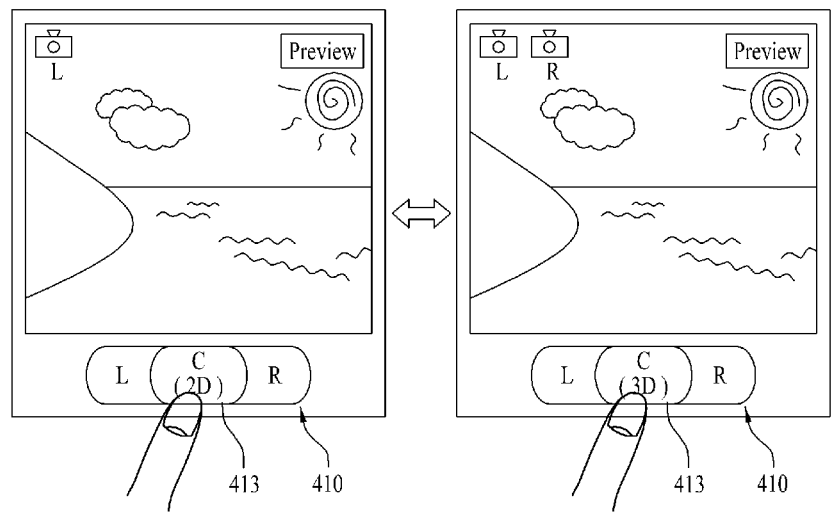
FIGS. 5A and 5B are diagrams of a switching process between a 2D photograph mode and a 3D photograph mode according to an embodiment of the present invention.

Referring to FIG. 5A, while a 2D photograph mode or a 3D photograph mode is set, and the user inputs a photograph mode switching touch action on the common zone 413, the mobile terminal 100 switches to the 3D photograph mode or the 2D photograph mode. Identification information 2D or 3D can be displayed if the 2D or 3D photograph mode is set.

Figure 5B:
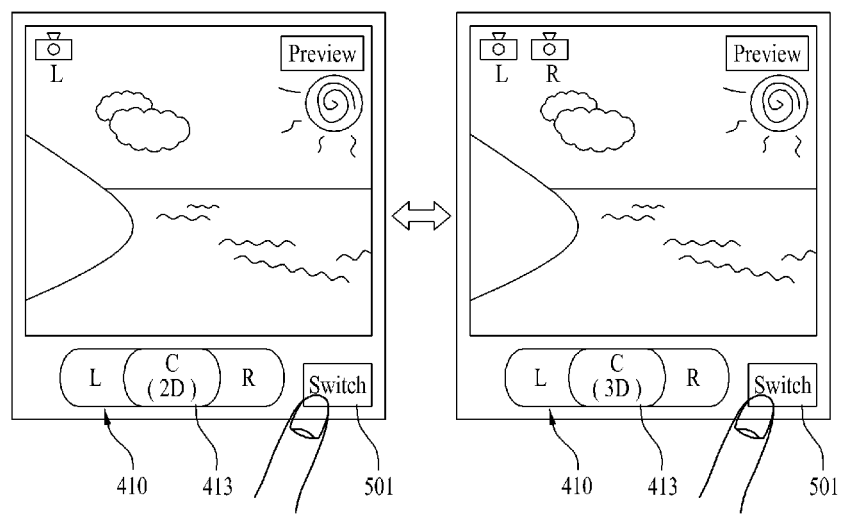

Referring to FIG. 5B, while a 2D photograph mode or a 3D photograph mode is set, the user can perform a touch action on a switch command zone 501, and the mobile terminal 100 switches to the 3D photograph mode or the 2D photograph mode. Optionally, the photograph mode switching can be performed if a corresponding menu item is executed via a menu search or a motion of a corresponding terminal is detected.

Next, the setting a 2D photograph mode (first case) and the case of setting a 3D photograph mode (second case) will be separately explained in the following description.

Referring to the first case in FIG. 3, the controller 180 displays at least one of a first image input from the first camera and a second image input from the second camera as a preview image (S351). The displaying step S351 can be performed using the touchscreen 151. The controller 180 can also display one of the first and second images selected by a user or randomly selected by the controller as the preview image.

For instance, if the first camera is designated as a basic camera, the controller 180 can display the first image as the preview image. Furthermore, if the first image is displayed as the preview image, the second camera can be turned off (i.e., no input image). Alternatively, even if an image is externally input while the second camera is turned on, the input image can not be displayed as the preview image.

A process for displaying a first image as a preview image will now be explained with reference to FIGS. 6A to 6C, which are diagrams of a preview image input from a left camera in a 2D photograph mode according to the present invention. In the following description, the first camera corresponds to the left camera, for example.

Figure 6B:
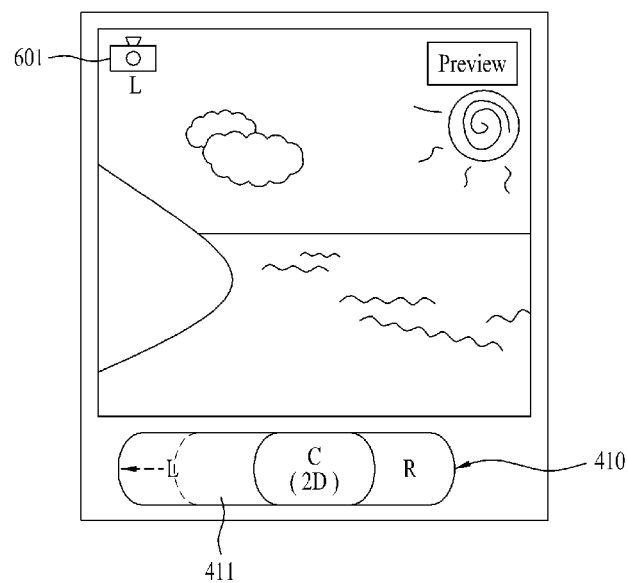
Figure 6C:
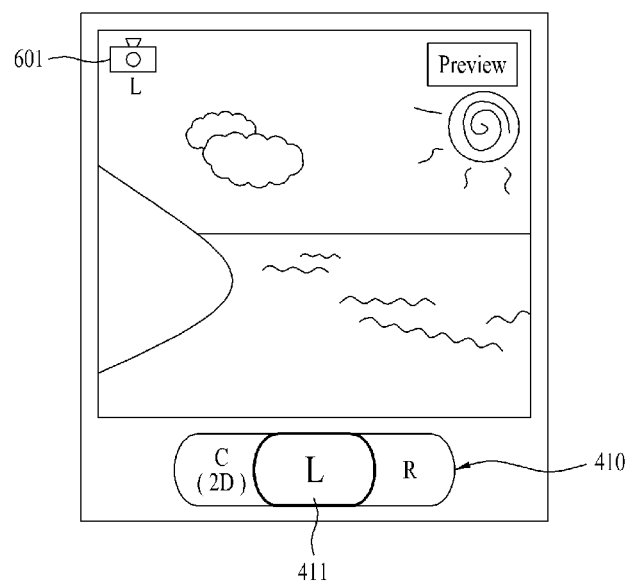

Referring to FIGS. 6A to 6C, when executing a camera related application, the mobile terminal 100 activates the first camera designated as the basic camera, displays a first image input from the first camera as a preview image, and displays an indicator 601 indicating that the first image is the preview image input from the first camera on a prescribed region of the first image.

In addition, referring to FIG. 6A(b), while displaying the first image as the preview image on a main screen, the mobile terminal 100 can display a portion of a second image input from the second camera behind the main screen. When the first image input from the first camera is displayed as the preview image, the photograph command key 410 can also identifiably display the first zone 411 corresponding to the first camera.

For instance, the first zone 411 is represented thick or as a color different from that of other zones (see FIGS. 6A(a) and 6A(b)), is enlarged into a predetermined size (see FIG. 6B), or can be arranged at a center by switching its position to that of the common zone 413 (see FIG. 6C), by which the present invention is non-limited. That is, in order to indicate that the currently displayed preview image is the first image, the mobile terminal 100 can identifiably display the first zone 411 in various ways.

A process for displaying a second image as a preview image is explained with reference to FIGS. 7A to 7C, which are diagrams of a preview image input from a right camera in a 2D photograph mode according to an embodiment of the present invention. In the following description, the second camera corresponds to the right camera for example.

Figure 7A:
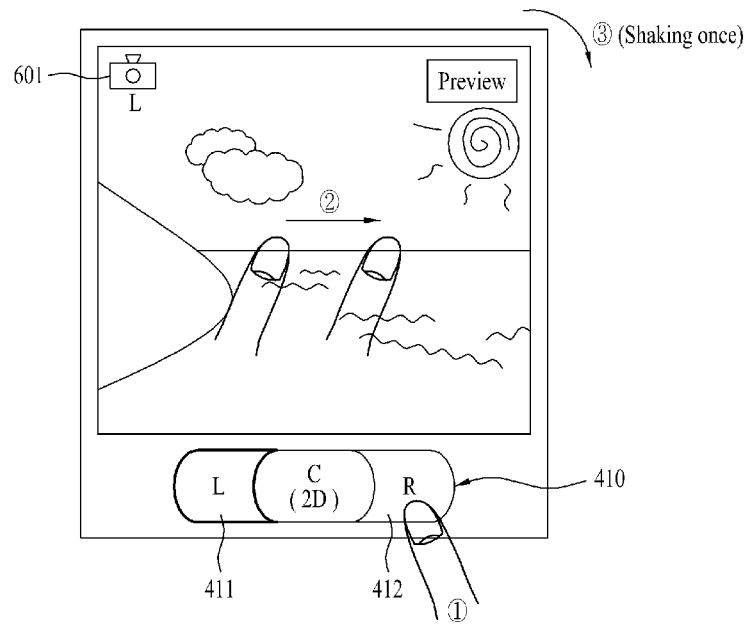
FIGS. 7A to 7C are diagrams of a preview image input from a right camera in a 2D photograph mode according to an embodiment of the present invention.

Referring to FIG. 7A, while the first image input from the first camera is displayed as the preview image, the user can input a command signal for switching the second image input from the second camera to the preview image (hereinafter named a preview switch command signal).

For instance, the user can input the preview switch command signal by inputting a preview command touch action on the second zone 412 (1), input a touch & drag or flicking action on the first image in a first direction using a single pointer (2), or shake the terminal (3), by which the present invention is non-limited. That is, the preview switch command signal can by input in various ways (e.g., voice input commands, pressing mechanical keys, etc.).

Figure 7B:
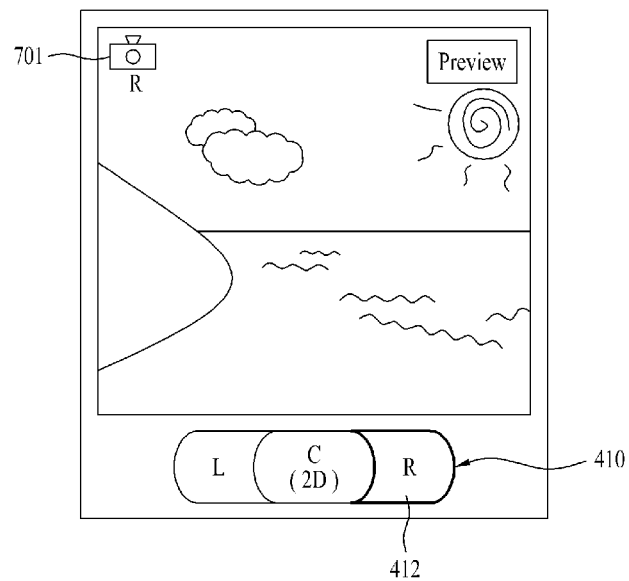
Figure 7C:
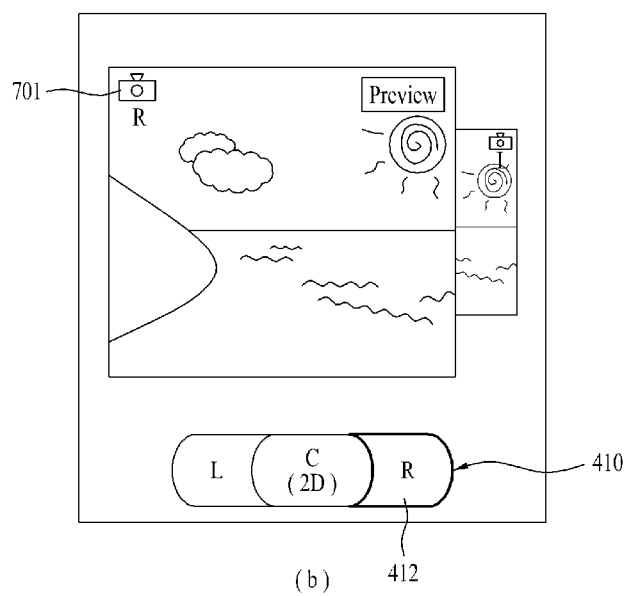

Referring to FIGS. 7B and 7C, when receiving the input of the preview switch command signal in FIG. 7A, the mobile terminal 100 switches the preview image from the first image to the second image. In addition, while the mobile terminal 100 displays the second image as the preview image, the mobile terminal 100 can display an indicator 701 indicating that the displayed image is the preview image input from the second camera on a prescribed region of the second image.

In addition, referring to FIG. 7C, while the mobile terminal 100 displays the second image as the preview image on a main screen, the mobile terminal 100 can display a portion of the first image input from the first camera behind the main screen. Also, when the second image input from the second camera is displayed as the preview image, the mobile terminal 100 can identifiably display the second zone 412 corresponding to the second camera.

For instance, the second zone 412 is represented thick or as a color different from that of other zones (see FIGS. 7B and 7C), is enlarged into a predetermined size, or can be arranged at a center by switching its position to that of the common zone 413.

A process for displaying first and second images as a preview image will now be explained with reference to FIGS. 8A and 8B, which are diagrams of preview images respectively input from left and right cameras in a 2D photograph mode according to an embodiment of the present invention. In the following description, the first camera and the second camera correspond to the left camera and the right camera, respectively, for example.

Figure 8A:
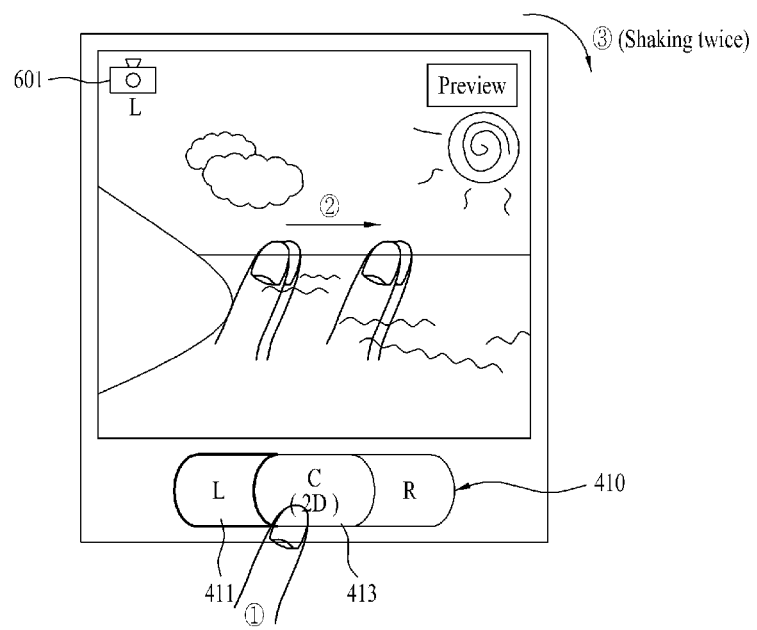
FIGS. 8A and 8B are diagrams of preview images respectively input from left and right cameras in a 2D photograph mode according to the present invention.

Referring to FIG. 8A, while mobile terminal 100 displays the first image input from the first camera (or the second image input from the second camera) as a preview image, the mobile terminal 100 can receive a preview switch command signal for switching the first and second images respectively input from the first and second cameras to the preview image.

For instance, the preview switch command signal can correspond to a preview command touch action on the common zone 413 from a user (1), a touch & drag or flicking action on the preview image in a first direction using a single pointer (2), or double terminal shakings (3). Assuming that the first image is displayed as the preview image, a preview switch command signal for switching to the second image and a preview switch command signal for switching to the first and second images can differ from each other in an input pattern.

Figure 8B:
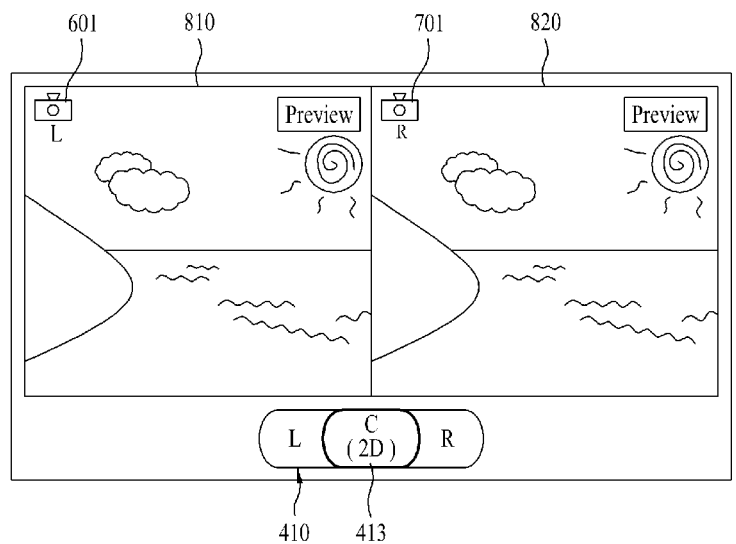

Referring to FIG. 8B, when receiving the preview switch command signal in FIG. 8A, the mobile terminal 100 switches the preview image from the first image to the first and second images, partitions the screen into a plurality of regions, and displays the first image and the second image on the first region 810 and the second region 820, respectively. An indicator 601 indicating the preview image input from the first camera and an indicator 701 indicating the preview image input from the second camera can also be displayed on a prescribed region of the first image and a prescribed region of the second image, respectively.

In addition, when displaying the first and second images respectively input from the first and second cameras as the preview image, the mobile terminal 100 can identifiably display the common zone 413 corresponding to the first and second cameras in common. For instance, the common zone 413 can be represented thick or as a color different from that of other zones (see FIG. 8B) or can be enlarged into a predetermined size.

Referring now to FIG. 3, when receiving an input of a photograph command touch action on the common zone in the photograph command key, the mobile terminal 100 photographs the first and second images respectively input from the first and second cameras under the control of the controller 180 (S352).

In particular, when receiving the input of the photograph command touch action on the common zone, the controller 180 generates a common photograph command signal and controls the first and second cameras to photograph the currently input first and second images according to the generated common photograph command signal, respectively.

For instance, the common photograph command signal can be generated if the photograph command touch action on the common zone is input. In another instance, if a first photograph command touch action on the first zone and a second photograph command touch action on the second zone are simultaneously received, the common photograph command signal can be generated. In still another instance, if a touch action on a key or a key zone (different from the common zone) corresponding to a common photograph command for photographing both of the first and second images is input, the common photograph command signal can be generated. In another instance, if a terminal motion corresponding to a common photograph command for photographing both of the first and second images is detected, the common photograph command signal can be generated.

In addition, in the photographing step S352, when the photograph command touch action on the common zone is input, and if the first and second images are being displayed as the preview image, the mobile terminal 100 can directly photograph the first and second images. In another example, in the photographing step S352, when the photograph command touch action on the common zone is input, and if either the first image or the second image is being displayed as the preview image, the mobile terminal 100 can switch the preview image to the first and second images and photograph the first and second images. In this instance, the photograph command touch action can be re-input after the switching of the preview image.

The controller 180 then performs a 2D image processing on the photographed first and second images under (S353). Also, in the performing step S353, the mobile terminal 100 processes the photographed first and second images into individually photographed images, respectively, by a 2D image processing (hereinafter named an individual image processing), or can generate a panoramic image using the photographed first and second images (hereinafter named a panoramic image processing). In this case, the panoramic image can bring such an effect that the first and second images are consecutively photographed by shifting positions of the first and second images with reference to a common part in-between.

Of course, when receiving an input of a photograph command touch action on the common zone, the mobile terminal 100 can discriminate whether the input photograph command touch action corresponds to a command for the individual image processing or the panoramic image processing. In this instance, since a touch action pattern set for the individual image processing is different from that for the panoramic image processing, the mobile terminal 100 can discriminate the input photograph command touch action.

The controller 180 of the mobile terminal 100 also displays the first and second images processed by the individual image processing as photographed images on individual regions, respectively or displays the generated panoramic image as the photographed image (S354). In addition, the displaying step S354 can be performed using the touchscreen 151.

The displaying step S354 will now be explained in more detail with reference to FIGS. 9A to 9C, which are diagrams for photographing a first image and a second image when receiving an input of a photograph command touch action on a common zone in a 2D photograph mode according to an embodiment of the present invention.

Figure 9A:
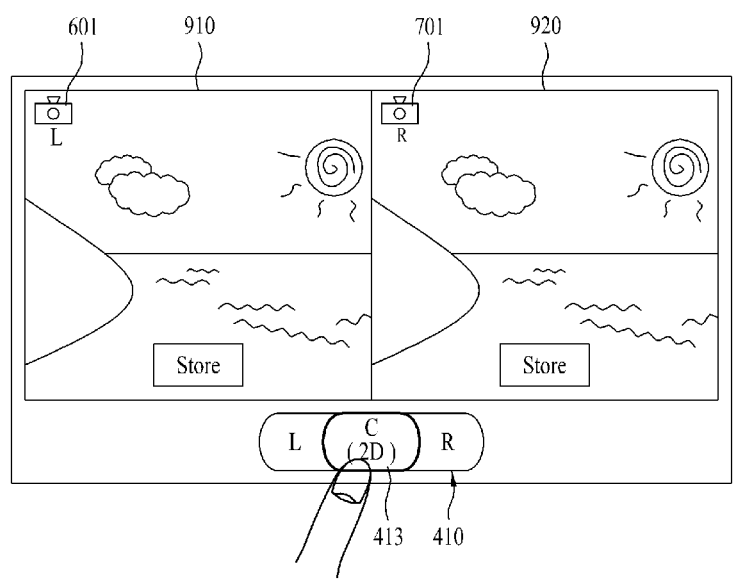

Referring to FIGS. 9A and 9B, when receiving a photograph command touch action on the common zone 413, the mobile terminal 100 photographs the input first and second images as individual images using the first camera and the second camera, respectively. In particular, referring to FIG. 9A, the mobile terminal 100 partitions the screen into a plurality of regions and displays the photographed first image and the photographed second image on the first region 910 and the second region 920, respectively.

In more detail, referring to FIG. 9B(a), the mobile terminal 100 displays the photographed second image as a subscreen 901 on a prescribed region of the screen while displaying the photographed first image on the whole screen. If the subscreen 901 having The second image displayed thereon is touched in FIG. 9B(a), the mobile terminal 100 displays the first image as a subscreen 902 on the whole screen as shown in FIG. 9B(b). The controller 180 can also display an indicator 601 indicating the image photographed via the first camera and an indicator 701 indicating the image photographed via the second camera on the first image and the second image, respectively.

Figure 9C:
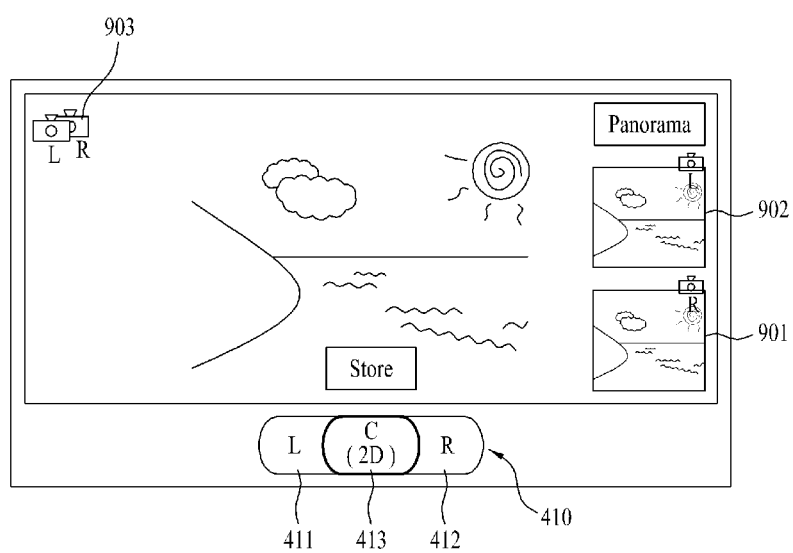

Referring to FIG. 9C, when receiving a photograph command touch action on the common zone 413, the mobile terminal 100 photographs the input first and second images using the first and second cameras, respectively, and generates a panoramic image by synthesizing the photographed first and second images together.

Subsequently, the mobile terminal 100 displays the generated panoramic image on the whole screen and displays a first subscreen 902 having the first image displayed thereon and a second subscreen 901 having the second image displayed thereon on a prescribed region of the screen.

The controller 180 can also display an indicator 903 indicating the image generated from synthesizing the images input from the first and second cameras together within the panoramic image. The indicator 601 indicating the image input from the first camera and the indicator 701 indicating the image input from the second camera can also be displayed within the first image and the second image, respectively. In addition, the photographed first image, the photographed second image and the generated panoramic image can be displayed as thumbnails on a single screen.

Referring again to FIG. 3, in the photographing step S352, when receiving a touch & drag action on at least one of the first zone and the second zone in the photograph command key, the controller 180 can sequentially photograph the first image and the second image with a time interval corresponding to a drag distance of the touch & drag action using the first camera and the second camera, respectively.

In particular, when receiving an input of a touch & drag action on the first or second zone, the controller 180 generates a standby photograph command signal having a time interval corresponding to the drag distance and then controls the first camera and the second camera to photograph the first image and the second image after predetermined standby duration according to the generates standby photograph command signal, respectively.

In this instance, the touch & drag action on the first or second zone can be input after the photograph command touch action on the common zone has been input. When receiving a touch & drag action on the first or second zone without a photograph command touch action input to the common zone, the controller 180 can generate both photograph command signals and standby photograph command signals for the first and second images. The standby duration per drag distance can also be specified by the controller 180 or a user. For instance, the standby duration can be specified as 5 seconds for the drag distance D.

The photographing process according to the standby photograph signal will now be explained in more detail with reference to FIGS. 10A to 12B. For clarity of the following description, a photographing action is performed with the first and second images displayed as the preview image, and the individual image processing is performed on each of the photographed first and second images.

FIGS. 10A to 10D illustrate performing a standby photographing process for each of the first camera and the second camera based on a first drag distance and a second drag distance, when the user inputs a first touch & drag action having the first drag distance and a second touch & drag action having the second drag distance to the first zone 411 and the second zone 412, respectively.

Figure 10A:
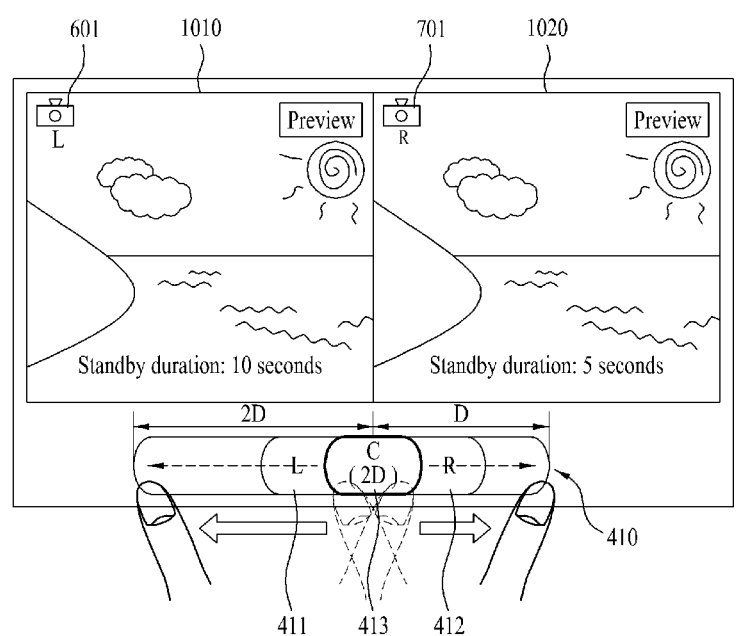
FIGS. 10A to 12B are diagrams for sequentially photographing a first image and a second image when receiving an input of a touch & drag action on a camera photograph key in a 2D photograph mode according to an embodiment of the present invention.

Referring to FIG. 10A, when the user inputs the first touch & drag action (a first drag distance 2D) in a left direction and the second touch & drag action (a second drag distance D) in a right direction to the first zone 411 and the second zone 412, respectively, the mobile terminal 100 sets a standby duration of the first camera to 10 seconds to correspond to the first drag distance and also sets a standby duration of the second camera to 5 seconds to correspond to the second drag distance.

Also, both of the first and second touch & drag actions can be simultaneously input using a multi-touch & drag action, and each of the first and second zones 411 and 412 can be extended in length in the drag direction to correspond to its drag distance. When the input first and second touch & drag actions are removed, the mobile terminal 100 can perform the standby photographing using each of the first and second cameras according to the set standby duration (e.g., 10 seconds and 5 seconds).

Referring to FIG. 10B(a), the first zone 411 increases its length by the drag distance 2D of the first touch & drag action and the second zone 412 extends its length by the drag distance D of the second touch & drag action. In addition, when the first or second touch & drag action is removed, the corresponding length of the first or second zone 411 or 412 can be gradually decreased as shown in FIGS. 10B(b) and 10B(c). The decreased distance can also be proportional to an elapse of the standby duration according to the standby photographing execution.

Figure 10C:
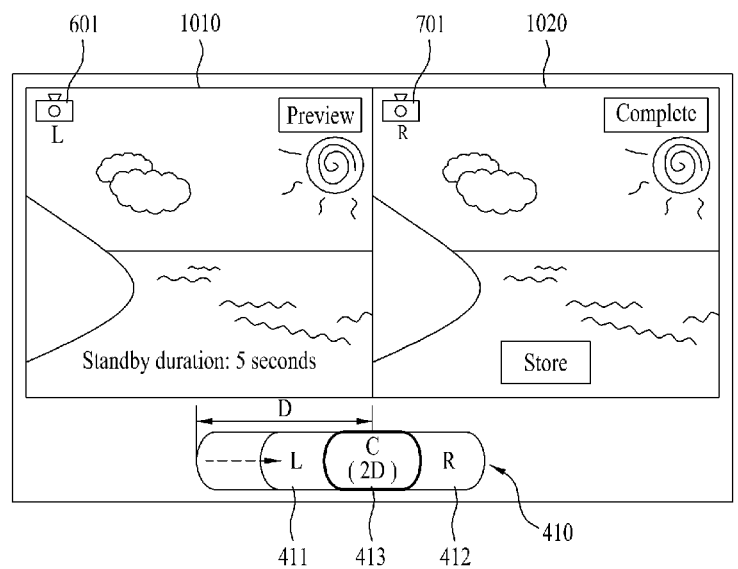

In particular, referring to FIG. 10B(b) and FIG. 10C, at the elapse point of the standby duration of 5 seconds (corresponding to the drag distance D), the first zone 411 has a length D (decreased by D from the initial length 2D) and the second zone 412 can have a length 0 (decreased by D from the initial length D). Since the standby duration of 5 seconds still remains for the first camera, the mobile terminal 100 maintains the photographing standby. On the other hand, since the standby duration does not exist for the second camera, the mobile terminal 100 can photograph the second image.

Figure 10D:
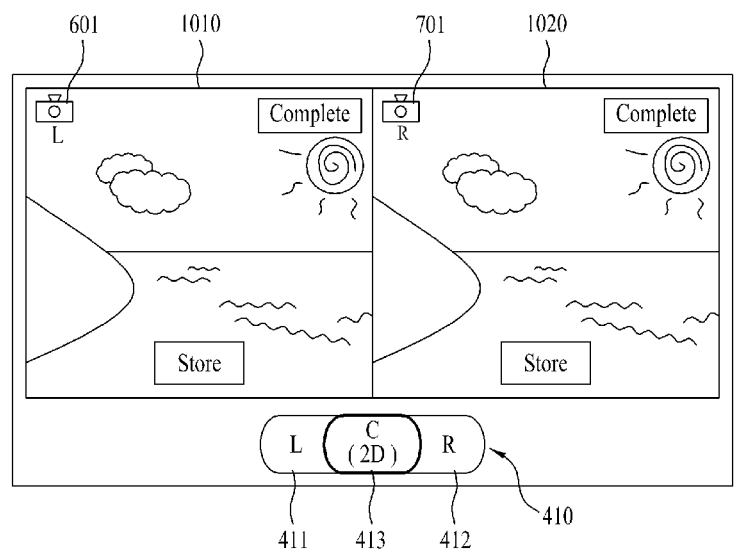

Referring to FIG. 10B(c) and FIG. 10D, at the elapse point of the standby duration of 10 seconds (corresponding to the drag distance 2D), the first zone 411 has a length 0 (decreased by 2D from the initial length 2D). Since the standby duration does not exist for the first camera, the mobile terminal 100 can photograph the first image.

Therefore, the mobile terminal 100 photographs the second image at the point of the elapse of 5 seconds after the photograph command touch action input and photographs the first image at the point of the elapse of 10 seconds after the photograph command touch action input.

Figure 11A:
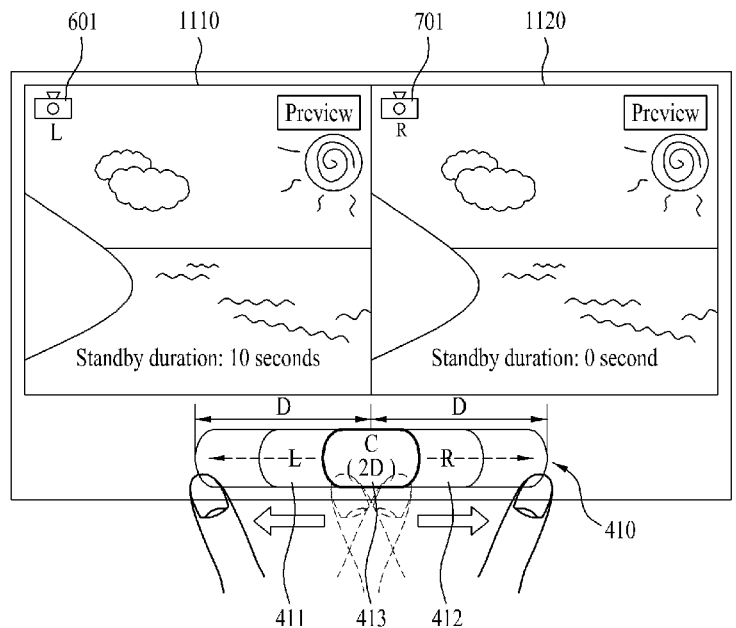
Figure 11B:
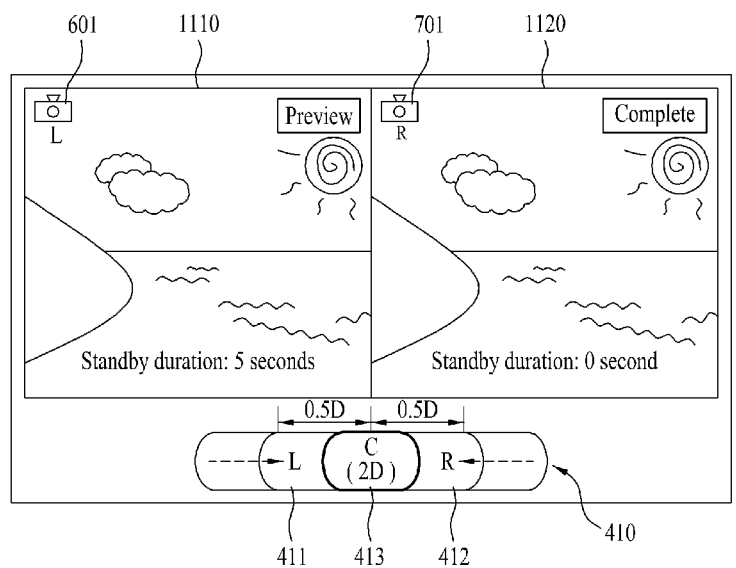

In addition, FIGS. 11A and 11B illustrate performing a standby photographing process on one of the first camera and The second camera to correspond to a sum of a first drag distance and a second drag distance, when the user inputs a first touch & drag action having the first drag distance and a second touch & drag action having the second drag distance to the first zone 411 and the second zone 412, respectively.

In addition, the first camera is designated as a camera for performing the standby photographing in advance. Alternatively, as a camera for performing the standby photographing, the mobile terminal 100 can designate the camera of the camera zone corresponding to the longer one of the first and second drag distances or the camera of the camera zone corresponding to the first or second touch & drag action removed earlier or later than the other. In another example, the mobile terminal 100 can randomly designate the camera to perform the standby photographing irrespective of a user selection.

Referring to FIG. 11A, when the user inputs the first touch & drag action (a first drag distance D) in a left direction and the second touch & drag action (a second drag distance D) in a right direction to the first zone 411 and the second zone 412, respectively, the mobile terminal 100 sets a standby duration of the first camera to 10 seconds to correspond to a sum 2D of the drag distances and also sets an instant photograph for the second camera. Also, the first zone 411 and the second zone 412 can be extended by the first touch & drag distance D and the second touch & drag distance D in a length direction, respectively.

When the user releases or removes the first and second touch & drag actions, the mobile terminal 100 enables the first camera to stand by for a photographing (standby duration of 10 seconds) and photographs the second image using the second camera. In addition, each of the first and second zones 411 and 412 can be gradually decreased into its length in proportion to the standby duration elapse according to the standby photographing execution for the first camera.

Referring to FIG. 11B, at a point of elapse of the standby duration of 5 seconds (corresponding to the drag distance D), a length sum of the first and second zones 411 and 412 has a length D (reduced to D from 2D) and a photograph standby can be maintained for the first camera (standby duration of 5 seconds). Moreover, at a point of elapse of the standby duration of 10 seconds (corresponding to the drag distance 2D), a length sum of the first and second zones 411 and 412 has a length 0 (reduced by 2D from the initial length 2D). Also, the mobile terminal 100 can photograph the first image because the standby duration does not exist for the first camera.

Therefore, the mobile terminal 100 photographs the second image instantly after the photograph command touch action input and photographs the first image at the point of the elapse of 10 seconds after the photograph command touch action input.

Figure 12A:
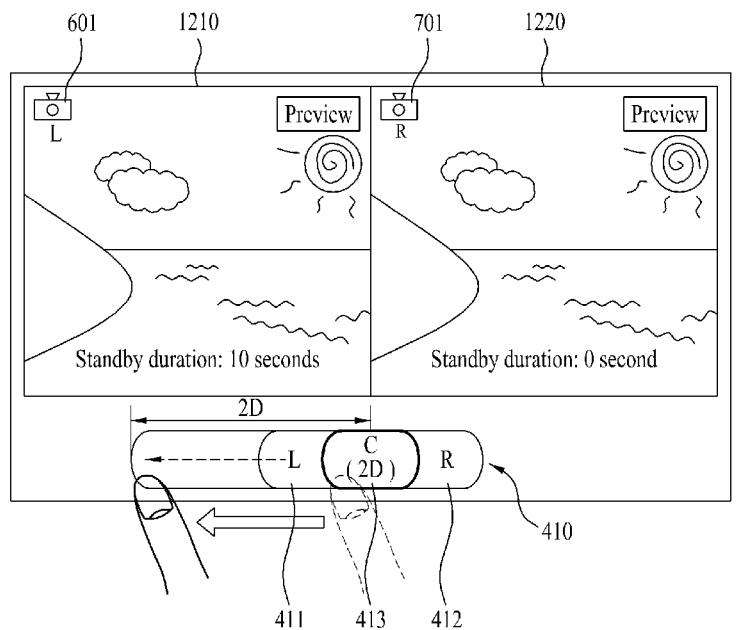
Figure 12B:
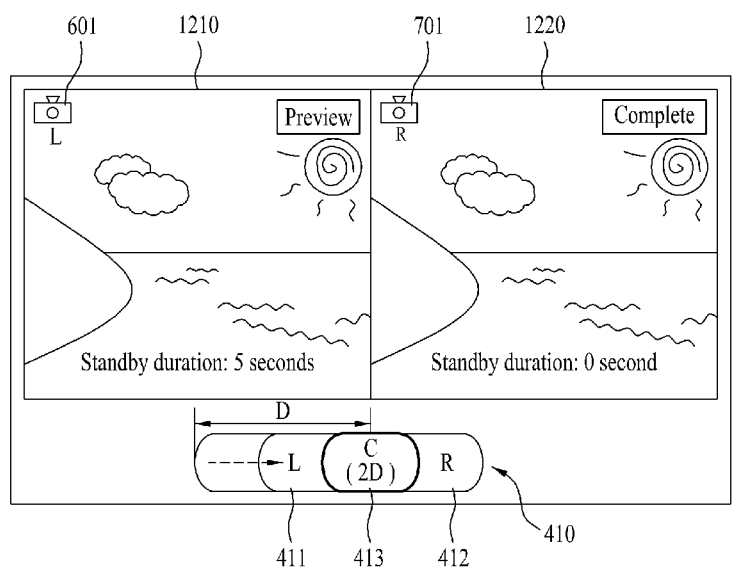

Next, FIGS. 12A and 12B illustrate performing a standby photographing on the first camera to correspond to a drag distance when the user inputs a touch & drag action to the first zone 411. Standby photographing also corresponds to delaying the taking of a picture for the standby duration.

Referring to FIG. 12A, when the user performs a touch & drag action (drag distance 2D) in a left direction to the first zone 411, the mobile terminal 100 sets a standby duration of the first camera to 10 seconds to correspond to the drag distance. In addition, the first zone 411 can be extended by the touch & drag distance 2D in a length direction.

When the user releases or removes the touch & drag action, the mobile terminal 100 enables the first camera to stand by for photographing (standby duration of 10 seconds) and photographs the second image using the second camera. The first zone 411 can also be gradually decreased into its length in proportion to the standby duration elapse according to the standby photographing execution for the first camera.

Referring to FIG. 12B, at a point of elapse of the standby duration of 5 seconds corresponding to the drag distance D, the first zone 411 has a length D (reduced by D from 2D) and a photograph standby can be maintained for the first camera (standby duration of 5 seconds). Moreover, at a point of elapse of the standby duration of 10 seconds (corresponding to the drag distance 2D), the first zone 411 has a length 0 (reduced by 2D from the initial length 2D). Also, the mobile terminal 100 can photograph the first image because the standby duration does not exist for the first camera.

Therefore, the mobile terminal 100 photographs the second image instantly after the photograph command touch action input and photographs the first image at the point of the elapse of 10 seconds after the photograph command touch action input.

Referring again to FIG. 3, in the photographing step S352, and when receiving an input of a photograph command touch action on the first zone, the controller 180 photographs the first image using the first camera. When receiving an input of a photograph command touch action on the second zone, the controller 180 can photograph the second image using the second camera.

The individual photographing of the first and second images will now be explained in more detail with reference to FIGS. 13A and 13B, which are diagrams illustrating photographing a first image or a second image when receiving an input of a photograph command touch action on a first or second zone in a 2D photograph mode according to an embodiment of the present invention.

Referring to FIG. 13A(a), while the first image input from the first camera is displayed as a preview image, and when the user inputs a photograph command touch action on the first zone 411, the mobile terminal 100 photographs the first image using the first camera.

Moreover, as shown in FIG. 13A(b), when the user inputs a touch & drag action having a drag distance D (standby duration of 5 seconds) together with an input of a photograph command touch action on the first zone 411, the mobile terminal 100 set a standby photographing of a standby duration of 5 seconds for the first camera and photographs the first image at a point of elapse of the standby duration of 5 seconds.

Referring to FIG. 13B(a), while the second image input from the second camera is displayed as a preview image, and when the user inputs a photograph command touch action on the second zone 412, the mobile terminal 100 photographs the second image using the second camera.

Moreover, as shown in FIG. 13B(b), when the user inputs a touch & drag action having a drag distance D (standby duration of 5 seconds) together with an input of a photograph command touch action on the second zone 412, the mobile terminal 100 sets a standby photographing of a standby duration of 5 seconds for the second camera and photographs the second image at a point of elapse of the standby duration of 5 seconds.

Next, the second case (i.e., 3D photograph mode) will be explained in more detail with reference to the accompanying drawings. In this description, the 3D photograph mode uses both of the first image input from the first camera and the second image input from the second camera, and the mobile terminal 100 can activate both of the first and second cameras in the 3D photograph mode.

Referring to FIG. 3, the controller 180 displays a third image by synthesizing a first image input from the first camera and a second image input from the second camera as a preview image (S361). The displaying step S361 can also be performed using the touchscreen 151.

In this instance, the third image corresponds to a 3D image generated by synthesizing the first and second images together or can correspond to a 3D image generated by setting left and right images to the first and second images, respectively. In particular, if the third image includes the 3D image, the mobile terminal 100 can activate a barrier for a 3D image display.

Further, in the displaying step S361, the mobile terminal 100 displays the first and second images as a preview image on corresponding regions, respectively, and synthesizes the 3D image using the first and second images photographed after receiving an input of a photograph command touch action.

Alternatively, in the displaying step S361, the mobile terminal 100 can selectively display at least one of the first image, the second image and the third image generated by synthesizing the first and second images together as a preview image.

A process for displaying a first image or a third image as a preview image will now be explained with reference to FIGS. 14A to 15C. In this example, the first camera and the second camera can include a left camera and a right camera, respectively.

First, a preview image display will be explained with reference to FIGS. 14A and 14B, which are diagrams of a preview image of a 3D image generated by synthesizing first and second images respectively input from left and right cameras in a 3D photograph mode according to an embodiment of the present invention.

Figure 14A:
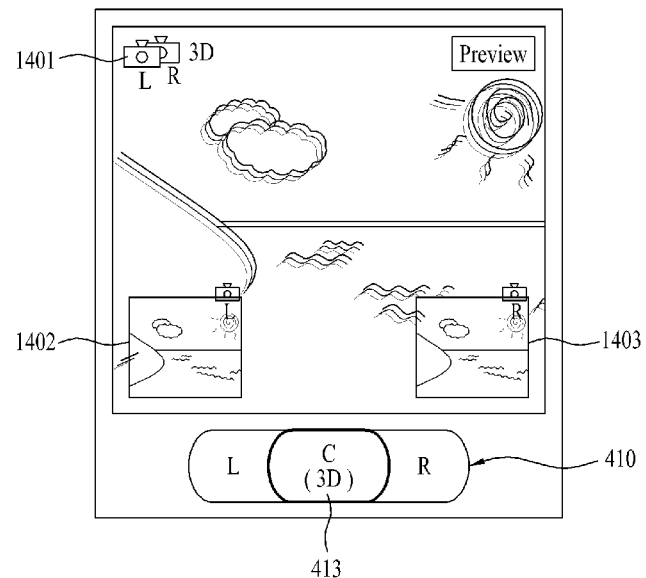
FIGS. 14A and 14B are diagrams of a preview image of a 3D image generated from synthesizing first and second images respectively input from left and right cameras in a 3D photograph mode according to an embodiment of the present invention.

Referring to FIG. 14A, when executing a camera related application, and while the mobile terminal 100 displays a third image as a preview image, the mobile terminal 100 displays a first sub-region 1402 for displaying a first image thereon and a second sub-region 1403 for displaying a second image thereon within the third image.

Figure 14B:
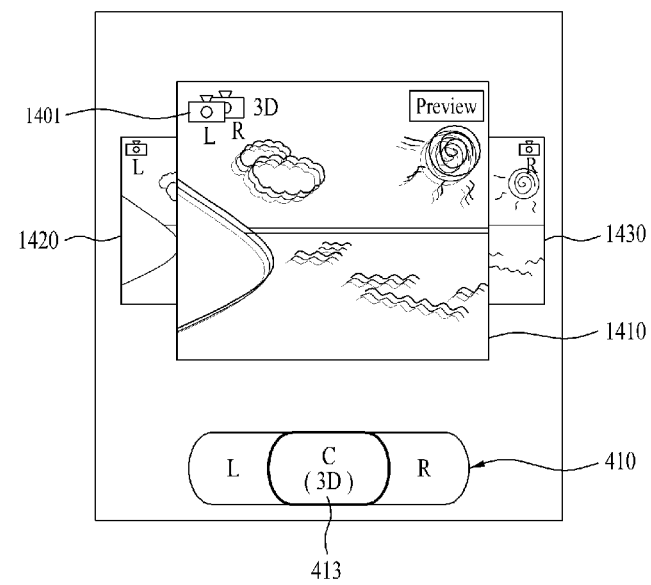

Referring to FIG. 14B, when the mobile terminal 100 displays the third image as the preview image on a main screen 1410, the mobile terminal 100 display a first subscreen 1420 for displaying the first image thereon and a second subscreen 1430 for displaying the second image thereon behind the main screen 1410.

In addition, each of the first and second subscreens 1420 and 1430 is relatively smaller in size than the main screen 1410. Moreover, if the first or second subscreen 1420 or 1430 is overlapped with the main screen 1410, it may not be possible to display a corresponding image part blocked by the main screen 1410.

Meanwhile, the controller 180 can display an indicator 1401 indicating that the third image is a 3D image generated by synthesizing the first and second images together within the third image. Moreover, when the third image is displayed as a preview image, the common zone 413 can be identifiably displayed (see FIGS. 6A to 6C).

A preview image switching will now be explained with reference to FIGS. 15A to 15C, which are diagrams of a preview image of a first/second image input from a left/right camera in a 3D photograph mode according to an embodiment of the present invention. In this description, the third image is displayed as a preview image, as shown in FIG. 14B. The following embodiment is also applicable to the case shown in FIG. 14A.

Figure 15A:
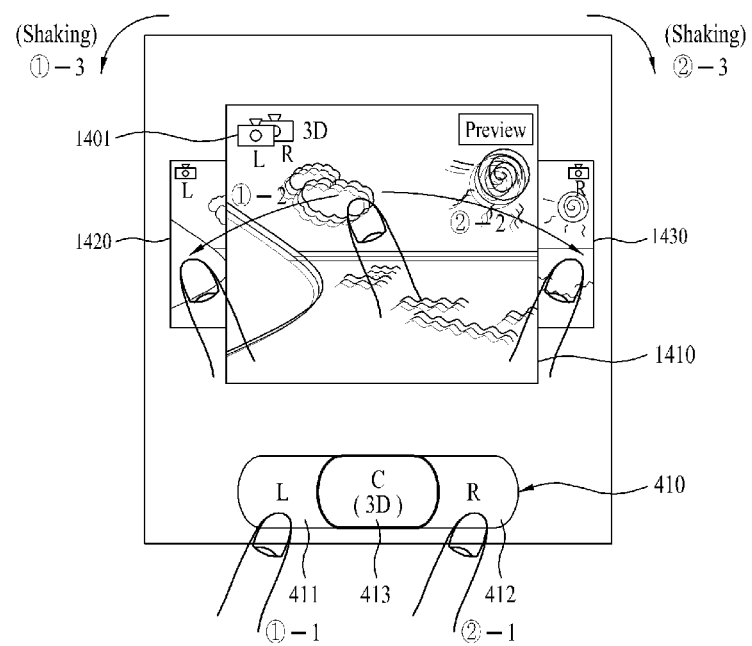
FIGS. 15A to 15C are diagrams of a preview image of a first/second image input from a left/right camera in a 3D photograph mode according to an embodiment of the present invention.

Referring to FIG. 15A, the user inputs a preview switching command signal for switching a third image to a first or second image. In particular, when the user inputs a preview command touch action on the first zone 411 from a user (1-1), inputs a touch & drag action or a flicking action on a preview image in a left direction (1-2), or shakes the terminal in the left direction (1-3), the preview switching command signal for switching the third image to the first image can be input.

Figure 15B:
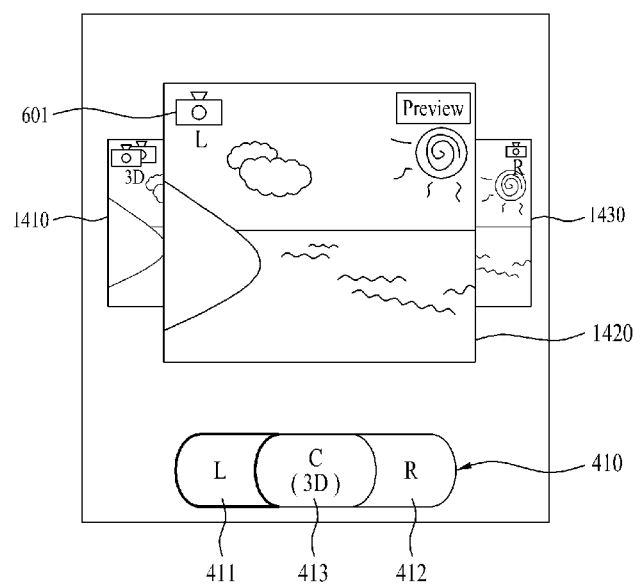

Hence, when receiving the input of the preview switching command signal for switching the third image to the first image, the mobile terminal 100 switches the preview image from the third image to the first image, displays the first image as the preview image on a main screen 1420, and display a first subscreen 1410 displaying the third image thereon and a second subscreen 1430 displaying the second image thereon behind the main screen 1420 as shown in FIG. 15B.

Alternatively, when the user inputs a preview command touch action on the second zone 412 (2-1), a touch & drag action or a flicking action on a preview image in a right direction (2-2), or shakes the terminal in the right direction (2-3), the preview switching command signal for switching the third image to the second image can be input.

Figure 15C:
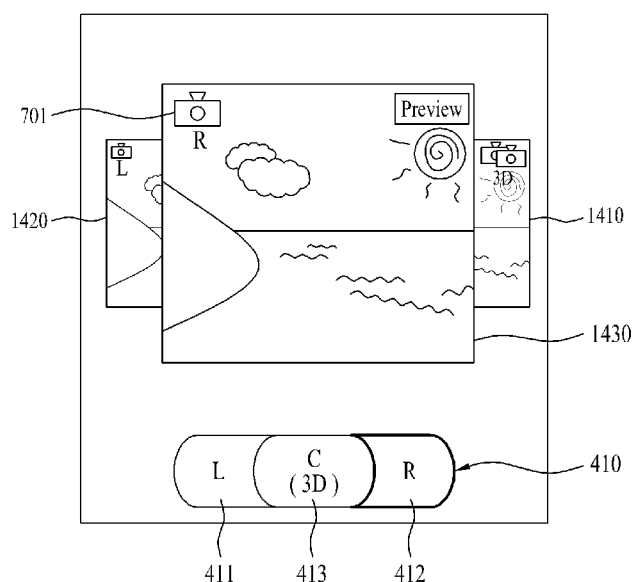

Hence, when receiving the input of the preview switching command signal for switching the third image to the second image, the mobile terminal 100 switches the preview image from the third image to the second image, displays the second image as the preview image on a main screen 1430, and displays the first subscreen 1410 displaying the third image thereon and the second subscreen 1420 displaying the first image thereon behind the main screen 1430 as shown in FIG. 15C. Indicators 601, 701 and 1401 corresponding to the first to third images can also be displayed on prescribed regions of the first to third images, respectively.

Referring again to FIG. 3, when receiving an input of a photograph command touch action on the common zone in the photograph command key, the mobile terminal 100 photographs the first image input from the first camera and the second image input from the second camera (S362). In particular, the photographing step S362 is similar to the former photographing step S352 when receiving the input of the photograph command touch action on the common zone in the 2D photograph mode.

The controller 180 also performs a 3D image processing on the photographed first and second images (S363). In the 3D image processing performing step S363, the controller 180 can generate a 3D image by generating the photographed first and second images together using 3D image processing. In particular, the controller 180 sets the first image and the second image to a left eye image and a right eye image, respectively, and generates a 3D image by combining the first and second images respectively set to the left and right eye images with each other.

The controller 180 then displays the generated 3D image as a photographed image under (S364). The display step S364 can also be performed using a touchscreen. Also, in the displaying step S364, the controller 180 can activate a barrier for the 3D image display, and can display the first image, the second image and the generated 3D image as thumbnails, respectively.

The display step S364 will now be explained in more detail with reference to FIGS. 16A and 16B, which are diagrams for photographing a first image and a second image when receiving an input of a photograph command touch action on a common zone in a 3D photograph mode according to an embodiment of the present invention.

Figure 16A:
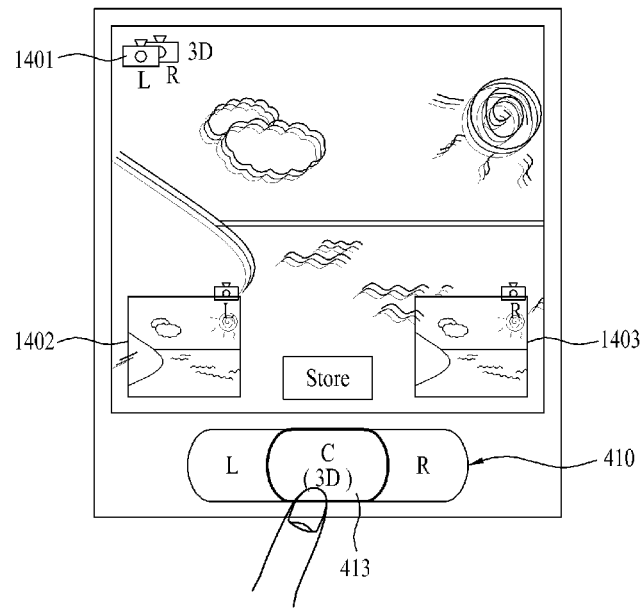
FIGS. 16A and 16B are diagrams for photographing a first image and a second image when receiving an input of a photograph command touch action on a common zone in a 3D photograph mode according to an embodiment of the present invention.
Figure 16B:
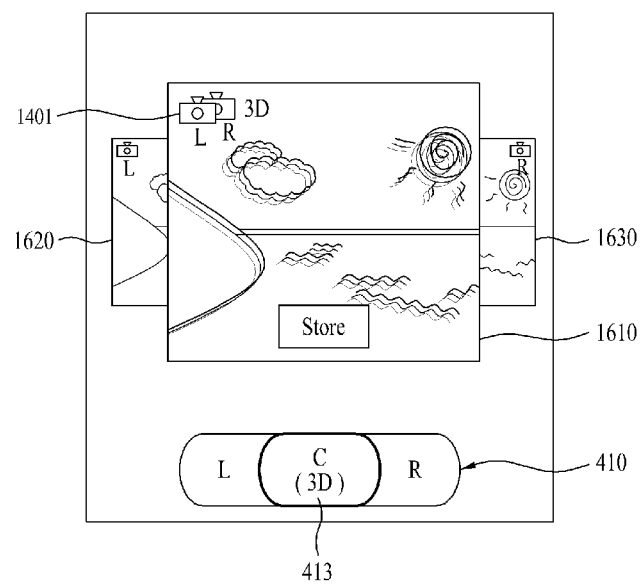

Referring to FIG. 16A and, when receiving an input of a photograph command touch action on the common zone 413, the mobile terminal 100 photographs a first image input using the first camera and a second image input using the second camera and then displays a 3D image generated by synthesizing the photographed first and second images together as a photographed image.

In particular, referring to FIG. 16A, while the mobile terminal 100 displays the 3D image as the photographed image on a whole screen, the mobile terminal 100 can display a first region 1402 displaying the first image thereon and a second region 1403 displaying the second image thereon within the 3D image.

If the first region 1402 or the second region 1403 is touched, the mobile terminal 100 displays the first or second image as the photographed image on the whole screen and can display the 3D image on a prescribed region of the whole screen. In particular, referring to FIG. 16B, while the mobile terminal 100 displays the 3D image as the photographed image on a main screen 1610, the mobile terminal 100 can display a first subscreen 1620 displaying the first image thereon and a second subscreen 1630 displaying the second image thereon behind the main screen 1610. An indicator 1401 indicating that the 3D image is generated by synthesizing the first and second images photographed using the first and second cameras can also be displayed within the 3D image.

Referring now to FIG. 3, in the photographing step S362, when receiving an input of a touch & drag action on at least one of the first zone and the second zone in the photograph command key, the controller 180 of the mobile terminal 100 can sequentially photograph the first image and the second image with a time interval corresponding to a drag distance attributed to the touch & drag action using the first and second camera. The former description of the sequential photographing in the 2D photograph mode describes a similar process.

A photographing process according to a standby photograph signal will now be explained in more detail with reference to FIGS. 17A to 19B, which are diagrams illustrating sequentially photographing a first image and a second image when receiving an input of a touch & drag action on a camera photograph key in a 3D photograph mode according to an embodiment of the present invention. In this example description, a photographing operation is performed when displaying a third image (or a 3D image) generated by synthesizing first and second images together as a preview image.

Figure 17A:
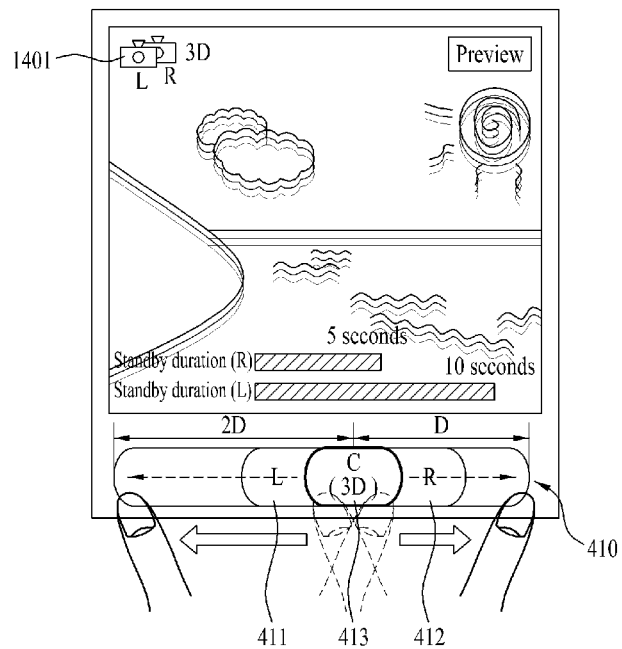
FIGS. 17A to 19B are diagrams for sequentially photographing a first image and a second image when receiving an input of a touch & drag action on a camera photograph key in a 3D photograph mode according to an embodiment of the present invention.
Figure 17B:
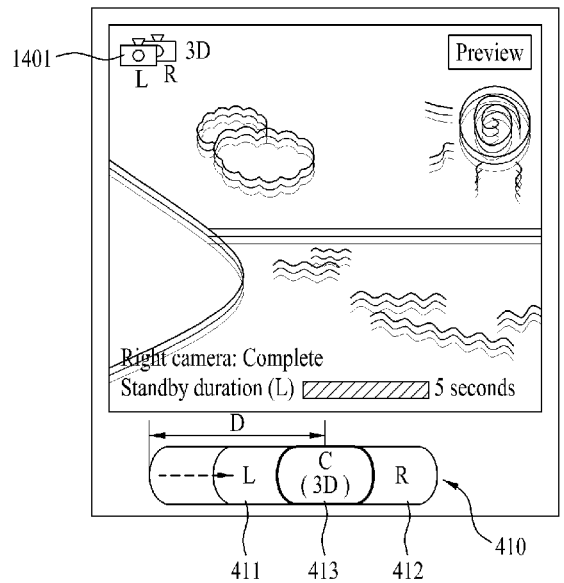
Figure 17C:
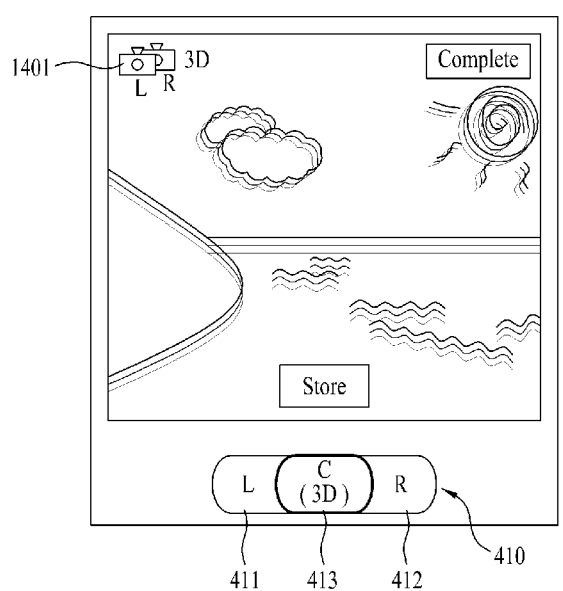

FIGS. 17A to 17C illustrate performing a standby photographing on each of the first camera and the second camera to correspond to a first drag distance and a second drag distance, when the user inputs a first touch & drag action having the first drag distance and a second touch & drag action having the second drag distance to the first zone 411 and the second zone 412, respectively.

Referring to FIG. 17A, when the user inputs the first touch & drag action (a first drag distance 2D) in a left direction and the second touch & drag action (a second drag distance D) in a right direction to the first zone 411 and the second zone 412, respectively, the mobile terminal 100 sets a standby duration of the first camera to 10 seconds to correspond to the drag distance and also sets a standby duration of the second camera to 5 seconds to correspond to the drag distance.

Referring to FIG. 17B, at the elapse point of the standby duration of 5 seconds corresponding to the drag distance D, the first zone 411 has a length D (decreased by D from the initial length 2D) and the second zone 412 has a length 0 (decreased by D from the initial length D). In this instance, since the standby duration of 5 seconds still remains for the first camera, the mobile terminal 100 maintains the photographing standby. On the other hand, since the standby duration does not exist for the second camera, the mobile terminal 100 can photograph the second image.

Referring to FIG. 17C, at the elapse point of the standby duration of 10 seconds corresponding to the drag distance 2D, the first zone 411 has a length 0 (decreased by 2D from the initial length 2D). In this instance, since the standby duration does not exist for the first camera, the mobile terminal 100 can photograph the first image.

Figure 18A:
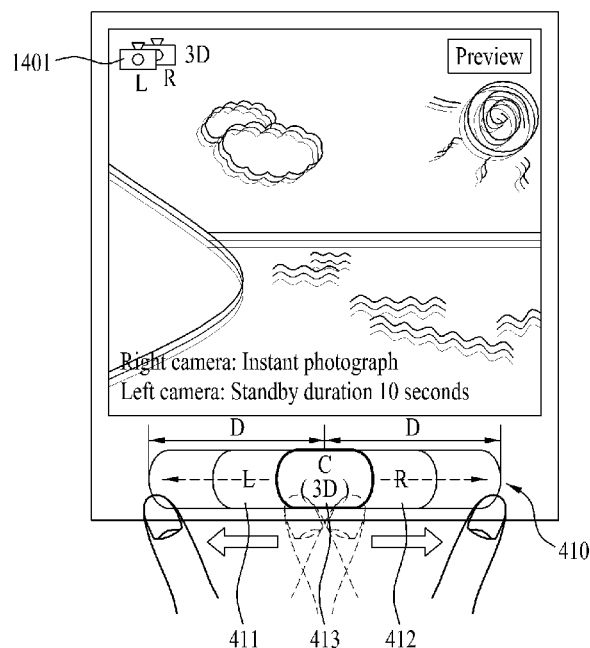
Figure 18B:
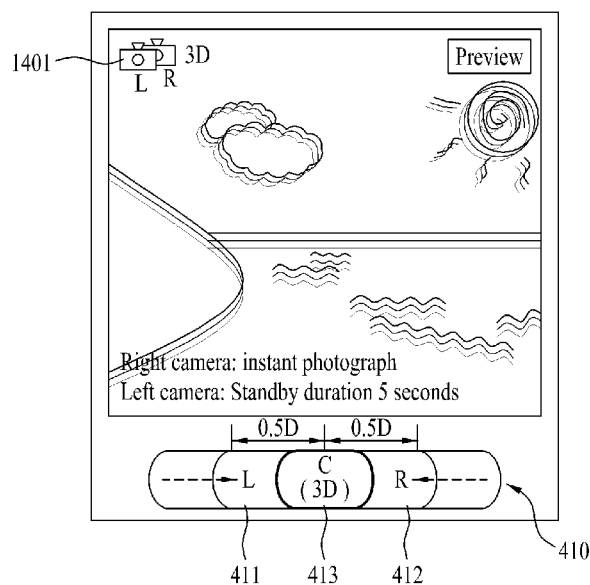

Also, FIGS. 18A and 18B illustrate performing a standby photographing on one of the first camera and the second camera to correspond to a sum of the first drag distance and the second drag distance, when the user inputs a first touch & drag action having a first drag distance and a second touch & drag action having a second drag distance to the first zone 411 and the second zone 412, respectively.

In this description, the first camera is designated as a camera for performing the standby photographing in advance. Referring to FIG. 18A, when the user inputs the first touch & drag action (a first drag distance D) in a left direction and the second touch & drag action (a second drag distance D) in a right direction to the first zone 411 and the second zone 412, respectively, the mobile terminal 100 sets a standby duration of the first camera to 10 seconds to correspond to a sum 2D of the drag distances and also sets an instant photograph for the second camera.

Referring to FIG. 18B, at a point of elapse of the standby duration of 5 seconds corresponding to the drag distance D, a length sum of the first and second zones 411 and 412 has a length D (reduced by D from the initial length 2D) and a photograph standby can be maintained for the first camera (standby duration of 5 seconds). Moreover, at a point of elapse of the standby duration of 10 seconds (corresponding to the drag distance 2D), a length sum of the first and second zones 411 and 412 has a length 0 (reduced by 2D from the initial length 2D). Also, the mobile terminal 100 can photograph the first image because the standby duration does not exist for the first camera.

Figure 19A:
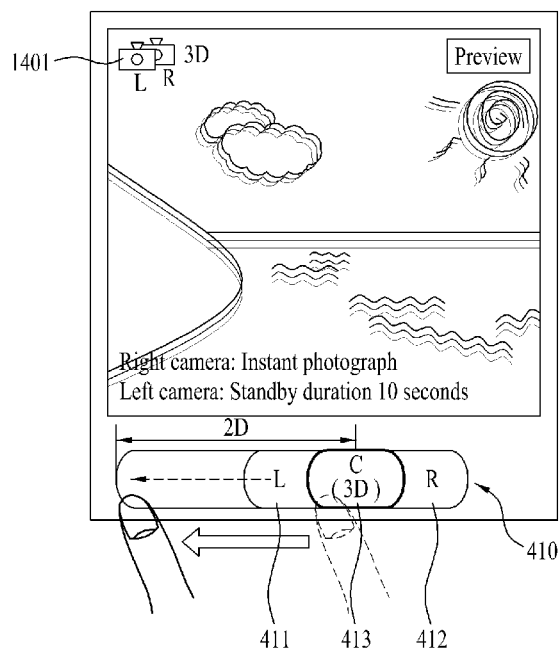
Figure 19B:
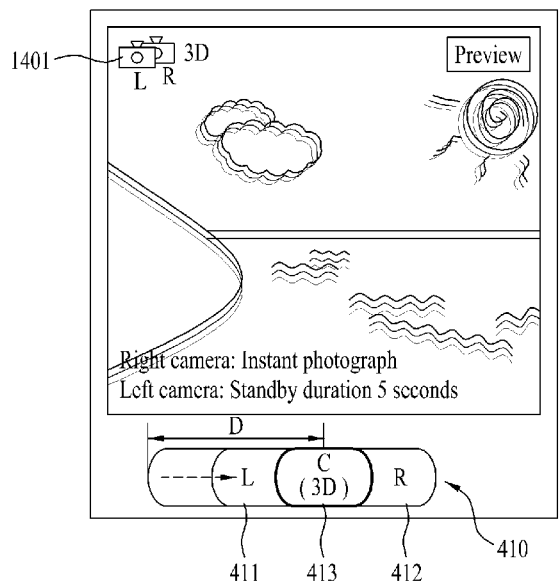

Next, FIGS. 19A and 19B illustrate performing a standby photographing on the first camera to correspond to a drag distance, when the user inputs a touch & drag action to the first zone 411. Referring to FIG. 19A, when the user inputs a touch & drag action (drag distance 2D) in a left direction to the first zone 411, the mobile terminal 100 sets a standby duration of the first camera to 10 seconds to correspond to the drag distance.

Referring to FIG. 19B, at a point of elapse of the standby duration of 5 seconds corresponding to the drag distance D, the first zone 411 has a length D (reduced by D from the initial length 2D) and a photograph standby can be maintained for the first camera (standby duration of 5 seconds). Moreover, at a point of elapse of the standby duration of 10 seconds corresponding to the drag distance 2D, the first zone 411 has a length 0 (reduced by 2D from the initial length 2D). The mobile terminal 100 can also photograph the first image because the standby duration does not exist for the first camera.

Referring again to FIG. 3, the controller 180 of the mobile terminal 100 stores the first and second images photographed in the photographing step S352/S362, the panoramic/3D image processed in the processing step S353/S363 and/or the photographed image displayed in the displaying step S354/S364 in the memory 160 (S370).

In particular, the storing step S370 can be performed when the user inputs a store command signal, and can be automatically performed irrespective of a presence or non-presence o an input of a store command signal. For instance, the store command signal can be input when a selection of a key or key zone corresponding to a store command, a detection of a terminal motion corresponding to a store command or the like.

According to an embodiment of the present invention, the mobile terminal can receive an input of a configuration setting touch action on one of a camera zone, a second zone and a common zone included in a photograph command key in a preview image display state or a photographed image display state.

In particular, when receiving an input of a configuration setting touch action on one of a camera zone, a second zone and a common zone, the controller 180 generates a configuration setting signal and controls the touchscreen 151 to display a screen corresponding to the generated configuration setting signal. In more detail, the configuration setting signal can be generated if a menu item corresponding to a configuration setting is executed or a terminal motion corresponding to a configuration setting is generated.

In addition, the mobile terminal 100 can display a screen for setting a photographing configuration of a camera corresponding to a zone, to which the configuration setting touch action is input, using the touchscreen 151.

The camera configuration setting will be described with reference to FIGS. 20A to 20D, which are diagrams displaying a configuration setting screen of a corresponding camera when receiving an input of a configuration setting touch action on a camera photograph key according to an embodiment of the present invention. In this description, a first image and a second image are displayed as a preview image.

Figure 20A:
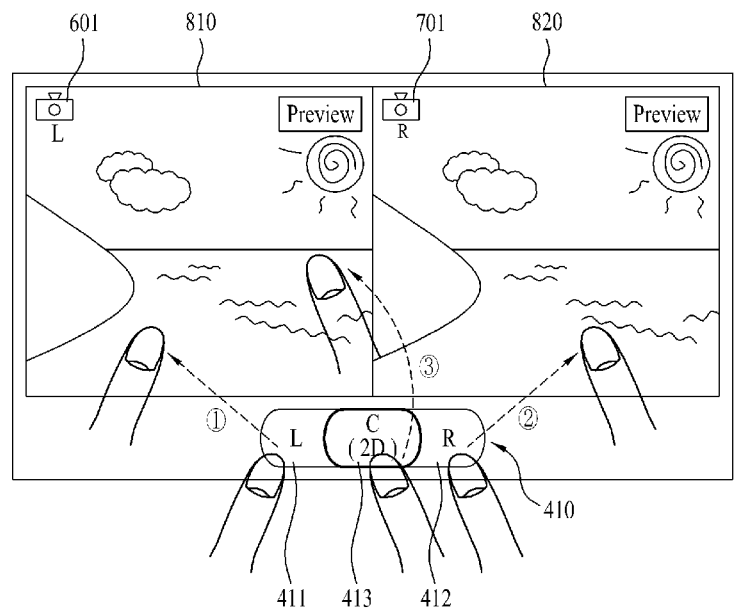
FIGS. 20A to 20D are diagrams for displaying a configuration setting screen of a corresponding camera when receiving an input of a configuration setting touch action on a camera photograph key according to an embodiment of the present invention.
Figure 20B:
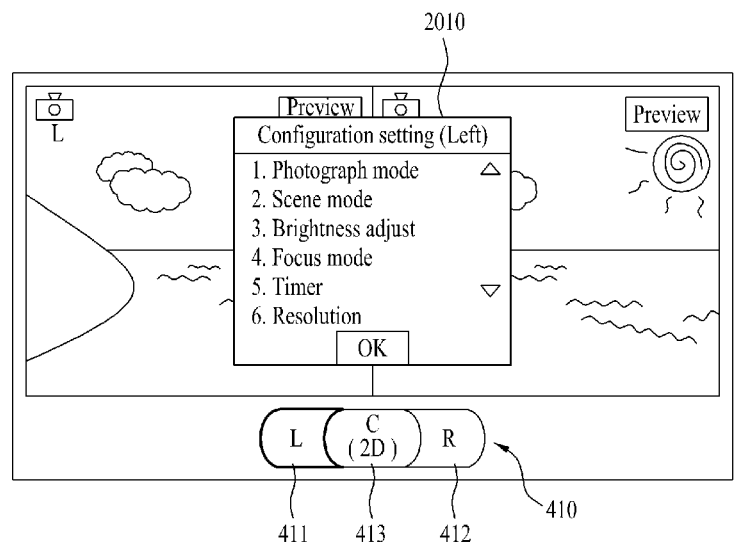

Referring to FIGS. 20A and 20B, when receiving a touch & drag action (1) from the first zone 411 to a random point within the preview image or a random point within a display region 810 of the first image, the mobile terminal 100 can display a screen 2010 for setting the photographing configuration of the first camera.

Figure 20C:
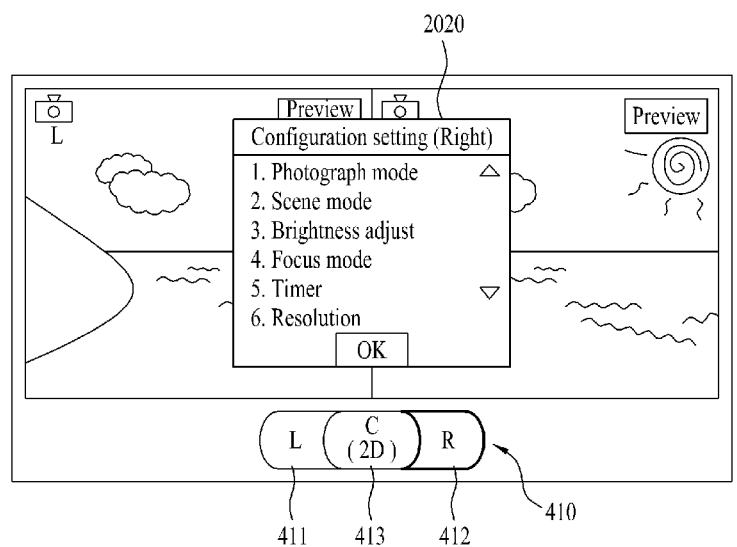
Figure 20D:
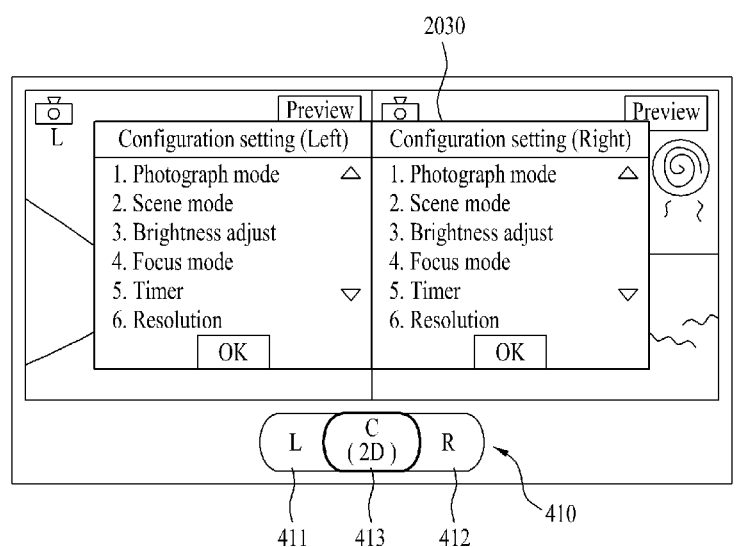

Referring to FIGS. 20A and 20C, when receiving a touch & drag action (2) from the second zone 412 to a random point within the preview image or a random point within a display region 820 of the second image, the mobile terminal 100 can display a screen 20200 for setting the photographing configuration of the second camera. Referring to FIGS. 20A and 20D, when receiving a touch & drag action (3) from the common zone 413 to a random point within the preview image, the mobile terminal 100 can display a screen 2030 for setting the photographing configurations of the first and second cameras.

Therefore, a user can set the photographing configuration of the first and/or second camera via one of the setting screens 2010 to 2030. The mobile terminal 100 can then perform a photographing using the first or second camera according to the set photographing configuration.

According to an embodiment of the present invention, when receiving a photograph command touch action of a first duration on the first or second zone 411 or 412, the mobile terminal 100 can consecutively photograph the first or second image by the count corresponding to the first duration. In this instance, when further receiving an input of a touch & drag action of a first distance on the first or second zone 411 or 412, the mobile terminal 100 can consecutively photograph the first or second image by the count corresponding to the first duration with a time interval corresponding to the first distance.

Moreover, when receiving a photograph command touch action of a first duration on the common zone 413, the mobile terminal 100 can consecutively photograph both of the first and second images by the count corresponding to the first duration. In this instance, when further receiving an input of a touch & drag action of a first distance on the common zone 413, the mobile terminal 100 can consecutively photograph both of the first and second images by the count corresponding to the first duration with a time interval corresponding to the first distance.

According to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include transmission via the Internet, for example.

Accordingly, embodiments of the present invention provide the following advantages. First, the present invention provides a photograph command key for controlling a plurality of cameras, thereby effectively controlling a plurality of the cameras individually or simultaneously. Secondly, the present invention generates a new photographed image using a plurality of images photographed via a plurality of cameras, thereby providing a new photographed image having a panoramic or 3D image processing performed thereon as well as an actually photographed image.

The mobile terminal also provides a user interface the user can use to effectively input a camera related control command to each of a plurality of the cameras. Moreover, the mobile terminal can generate a new photographed image using a plurality of images taken via a plurality of the cameras.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a first camera configured to receive an input of a first image;
a second camera configured to receive an input of a second image;
a touchscreen configured to display a photograph command key including a first zone, a second zone and a common zone; and
a controller configured to set a photograph mode selected from a 3D photograph mode and a 2D photograph mode, to control the first and second cameras to respectively capture the first and second images upon receiving a photograph command touch action on the common zone, and to perform either a 3D image processing or a 2D image processing on the photographed first and second images according to the set photograph mode,
wherein when the controller receives an input of a touch & drag action on the touchscreen of at least one of the first zone and the second zone, the controller is further configured to sequentially photograph the first image and the second image with a time interval corresponding to a drag distance of the touch & drag action using the first camera and the second camera, respectively.

2. The mobile terminal of claim 1, wherein when the 2D photograph mode is set, the controller is further configured to display at least one of the first and second images as a preview image on the touchscreen.

3. The mobile terminal of claim 2, wherein when the first image is displayed as the preview image on the touchscreen, the controller is further configured to display the second image as the preview image when receiving a preview command touch action on the second zone of the touchscreen, and
wherein the controller is further configured to display the first image and the second image as the preview image on the touchscreen when receiving the preview command touch action on the common zone.

4. The mobile terminal of claim 1, wherein the controller is further configured to display a 3D image generated by synthesizing the first image and the second image together as the preview image on the touchscreen, when the 3D photograph mode is set.

5. The mobile terminal of claim 1, wherein the controller is further configured to process the photographed first and second images into individual photographed images using 2D image processing, respectively, or to generate a panoramic image using the photographed first and second images when the 2D photograph mode is set.

6. The mobile terminal of claim 5, wherein the controller is further configured to display the first image and the second image as the individual photographed images on individual regions on the touchscreen, respectively, or to display the generated panoramic image as the photographed image on the touchscreen.

7. The mobile terminal of claim 1, wherein when the 3D photograph mode is set, the controller is further configured to generate a 3D image by synthesizing the photographed first and second images together by the 3D image processing and to display the generated 3D image on the touchscreen as a photographed image.

8. The mobile terminal of claim 7, wherein the controller is further configured to display the first image, the second image and the 3D image as thumbnails on the touchscreen.

9. The mobile terminal of claim 1, wherein when the 3D photograph mode is set, the controller is further configured to activate a barrier on the mobile terminal to generate a 3D image display.

10. The mobile terminal of claim 1, wherein when the 2D photograph mode is set, and the controller receives the input of the photograph command touch action on the first zone, the controller is further configured to photograph the first image using the first camera and when the controller receives the photograph command touch action on the second zone, the controller is controller is further configured to photograph the second image using the second camera.

11. The mobile terminal of claim 1, wherein when the controller receives a configuration setting touch action on the touchscreen of one of the first zone, the second zone and the common zone, the controller is further configured to display a screen on the touchscreen for setting a photograph configuration of a camera corresponding to the zone having the configuration setting touch action input thereto.

12. The mobile terminal of claim 1, wherein when the 2D photograph mode is set and the controller receives the input of a photograph mode switching touch action on the touchscreen of the common zone, the controller is further configured to switch the 2D photograph mode to the 3D photograph mode, and
wherein when the 3D photograph mode is set and the controller receives the input of the photograph mode switching touch action on the touchscreen, the controller is further configured to switch the 3D photograph mode to the 2D photograph mode.

13. The mobile terminal of claim 12, wherein the controller is further configured to display identification information indicating a currently set photograph mode within the common zone.

14. A method of controlling a mobile terminal, the method comprising:
receiving, via a first camera on the mobile terminal, an input of a first image;
receiving, via a second camera on the mobile terminal, an input of a second image;
displaying, on a touchscreen of the mobile terminal, a photograph command key including a first zone, a second zone and a common zone;
setting, via a controller on the mobile terminal, a photograph mode selected from a 3D photograph mode and a 2D photograph mode;
controlling, via the controller, the first and second cameras to respectively capture the first and second images upon receiving a photograph command touch action on the common zone; and
performing, via the controller, either a 3D image processing or a 2D image processing on the photographed first and second images according to the set photograph mode,
wherein when an input of a touch & drag action occurs on at least one of the first zone and the second zone, the method further comprises sequentially photographing the first image and the second image with a time interval corresponding to a drag distance of the touch & drag action using the first camera and the second camera, respectively.

15. The method of claim 14, wherein when the 2D photograph mode is set, the method further comprises displaying at least one of the first and second images as a preview image on the touchscreen, and
wherein when the first image is displayed as the preview image on the touchscreen, the method further comprises displaying the second image as the preview image when receiving a preview command touch action on the second zone of the touchscreen, and displaying the first image and the second image as the preview image on the touchscreen when receiving the preview command touch action on the common zone.

16. The method of claim 14, further comprising:
displaying a 3D image generated by synthesizing the first image and the second image together as the preview image on the touchscreen, when the 3D photograph mode is set.

17. The method of claim 14, further comprising:
processing the photographed first and second images into individual photographed images using 2D image processing, respectively, or generating a panoramic image using the photographed first and second images when the 2D photograph mode is set; and
displaying the first image and the second image as the individual photographed images on individual regions on the touchscreen, respectively, or displaying the generated panoramic image as the photographed image on the touchscreen.

18. The method of claim 14, wherein when the 3D photograph mode is set, the method further comprises generating a 3D image by synthesizing the photographed first and second images together by the 3D image processing and displaying the generated 3D image on the touchscreen as a photographed image.

19. The method of claim 14, wherein when the 2D photograph mode is set, and the input of the photograph command touch action is on the first zone, the method further comprises photographing the first image using the first camera, and when the photograph command touch action is on the second zone, the method further comprises photographing the second image using the second camera, and
wherein when the a configuration setting touch action occurs on the touchscreen of one of the first zone, the second zone and the common zone, the method further comprises displaying a screen on the touchscreen for setting a photograph configuration of a camera corresponding to the zone having the configuration setting touch action input thereto.

* * * * *